US012666218B2

(12) United States Patent
Laitinen et al.

(10) Patent No.: US 12,666,218 B2
(45) Date of Patent: Jun. 23, 2026

(54) GENERATING PARAMETRIC SPATIAL AUDIO REPRESENTATIONS

(71) Applicant: Nokia Technologies Oy, Espoo (FI)

(72) Inventors: Mikko-Ville Laitinen, Espoo (FI); Juha Tapio Vilkamo, Helsinki (FI); Jussi Kalevi Virolainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 207 days.

(21) Appl. No.: 18/490,442

(22) Filed: Oct. 19, 2023

(65) Prior Publication Data

US 2024/0137723 A1 Apr. 25, 2024
US 2024/0236601 A9 Jul. 11, 2024

(30) Foreign Application Priority Data

Oct. 21, 2022 (GB) ..................................... 2215632

(51) Int. Cl.
*H04S 7/00* (2006.01)
*G10L 19/008* (2013.01)
*H04S 3/00* (2006.01)

(52) U.S. Cl.
CPC ............ *H04S 7/303* (2013.01); *G10L 19/008* (2013.01); *H04S 3/008* (2013.01); *H04S 7/307* (2013.01);
(Continued)

(58) Field of Classification Search
CPC .......... H04S 7/303; H04S 3/008; H04S 7/307; H04S 2400/01; H04S 2400/15; H04S 2420/01; H04S 2400/11; G10L 19/008; G10L 19/0017; G10L 19/0018; G10L 21/0272; G10L 25/78; G10L 2021/02166
See application file for complete search history.

(56) References Cited

U.S. PATENT DOCUMENTS 10,522,167 B1 12/2019 Ayrapetian et al.
2014/0247945 A1 9/2014 Ramo et al. .................... 381/17
(Continued)

FOREIGN PATENT DOCUMENTS

WO WO-2010004473 A1 * 1/2010 ........... H04R 25/552
WO WO 2014/204997 A1 12/2014
(Continued)

OTHER PUBLICATIONS

Liang et al., "A Robust Beamforming Algorithm Based on Covariance Matrix Reconstruction and Steering Vector Estimation", 2020, J. Phys. Conf. Ser. 1601 062001 (Year: 2020).*
(Continued)

*Primary Examiner* — David L Ton
(74) *Attorney, Agent, or Firm* — McCarter & English, LLP

(57) ABSTRACT

A method for generating a spatial audio stream, the method including: obtaining at least two audio signals from at least two microphones; extracting from the at least two audio signals a first audio signal, the first audio signal including at least partially speech of a user; extracting from the at least two audio signals a second audio signal, wherein speech of the user is substantially not present within the second audio signal; and encoding the first audio signal and the second audio signal to generate the spatial audio stream such that a rendering of speech of the user to a controllable direction and/or distance is enabled.

19 Claims, 14 Drawing Sheets

(52) U.S. Cl.
CPC ....... *H04S 2400/01* (2013.01); *H04S 2400/11* (2013.01); *H04S 2400/15* (2013.01)

(56) References Cited

U.S. PATENT DOCUMENTS

| | | | | |
|---|---|---|---|---|
| 2016/0150343 | A1 | 5/2016 | Wang et al. | |
| 2023/0084225 | A1 * | 3/2023 | Laitinen ................ | H04M 3/568<br>381/303 |

FOREIGN PATENT DOCUMENTS

| | | | | | |
|---|---|---|---|---|---|
| WO | WO 2020/231883 | A1 | | 11/2020 | |
| WO | WO-2024012805 | A1 | * | 1/2024 | ........... G10L 19/008 |

OTHER PUBLICATIONS

Wikipedia Contributors, "Principal component analysis," Wikipedia, The Free Encyclopedia, Sep. 23, 2022.

Ibrahim Karim et al. "Primary-Ambient Source Separation for Upmixing to Surround Sound Systems" 2018 IEEE International Conference on Acoustics, Speech and Signal Processing (ICASSP) Apr. 15, 2018, pp. 431-435.

Nokia Corporation et al. "Propsal for Metadata-Assisted Spatial Audio" 3GPP; S4-220466, 3rd Generation Partnership Project (3GPP) Mar. 31, 2022.

* cited by examiner

| |
|---|
| FIG.12A |
| FIG.12B |

GENERATING PARAMETRIC SPATIAL AUDIO REPRESENTATIONS

FIELD

The present application relates to apparatus and methods for generating parametric spatial audio representations, but not exclusively for generating parametric spatial audio representations from a binaural recording for an audio encoder.

BACKGROUND

There are many ways to capture spatial audio. One option is to capture the spatial audio using a microphone array, e.g., as part of a mobile device. Using the microphone signals, spatial analysis of the sound scene can be performed to determine spatial metadata in frequency bands. Moreover, transport audio signals can be determined using the microphone signals. The spatial metadata and the transport audio signals can be combined to form a spatial audio stream.

Metadata-assisted spatial audio (MASA) is one example of a spatial audio stream. It is one of the input formats the upcoming immersive voice and audio services (IVAS) codec will support. It uses audio signal(s) together with corresponding spatial metadata (containing, e.g., directions and direct-to-total energy ratios in frequency bands) and descriptive metadata (containing additional information relating to, e.g., the original capture and the (transport) audio signal(s)). The MASA stream can, e.g., be obtained by capturing spatial audio with microphones of, e.g., a mobile device, where the set of spatial metadata is estimated based on the microphone signals. The MASA stream can be obtained also from other sources, such as specific spatial audio microphones (such as Ambisonics), studio mixes (e.g., 5.1 mix) or other content by means of a suitable format conversion. It is also possible to use MASA tools inside a codec for the encoding of multichannel channel signals by converting the multichannel signals to a MASA stream and encoding that stream.

SUMMARY

According to a first aspect there is provided a method for generating a spatial audio stream, the method comprising: obtaining at least two audio signals from at least two microphones; extracting from the at least two audio signals a first audio signal, the first audio signal comprising at least partially speech of a user; extracting from the at least two audio signals a second audio signal, wherein speech of the user is substantially not present within the second audio signal; and encoding the first audio signal and the second audio signal to generate the spatial audio stream such that a rendering of speech of the user to a controllable direction and/or distance is enabled.

The spatial audio stream may further enable a controllable rendering of captured ambience audio content.

Extracting from the at least two audio signals the first audio signal may further comprise applying a machine learning model to the at least two audio signals or at least one audio signal based on the at least two audio signals to generate the first audio signal.

Applying the machine learning model to the at least two audio signals or at least one audio signal based on the at least two audio signals to generate the first audio signal may further comprise: generating a first speech mask based on the at least two audio signals; and separating the at least two audio signals into a mask processed speech audio signal and a mask processed remainder audio signal based on the application of the first speech mask to the at least two audio signals or at least one audio signal based on the at least two audio signals.

Extracting from the at least two audio signals the first audio signal may further comprise beamforming the at least two audio signals to generate a speech audio signal.

Beamforming the at least two audio signals to generate the speech audio signal may comprise: determining steering vectors for the beamforming based on the mask processed speech audio signal; determining a remainder covariance matrix based on the mask processed remainder audio signal; and applying a beamformer configured based on the steering vectors and the remainder covariance matrix to generate a beam audio signal.

Applying the machine learning model to the at least two audio signals or at least one audio signal based on the at least two audio signals to generate the first audio signal may further comprise: generating a second speech mask based on the beam audio signal; and applying a gain processing to the beam audio signal based on the second speech mask to generate the speech audio signal.

Applying the machine learning model to the at least two audio signals or at least one signal based on the at least two audio signals to generate the first audio signal further may further comprise equalizing the first audio signal.

Applying the machine learning model to the at least two audio signals or at least one audio signal based on the at least two audio signals to generate the first audio signal may comprise generating at least one speech mask based on a trained network.

Extracting from the at least two audio signals the second audio signal may comprise: generating a positioned speech audio signal from the speech audio signals; and subtracting from the at least two audio signals the positioned speech audio signal to generate the at least one remainder audio signal.

Generating the positioned speech audio signal from the speech audio signals may comprise generating the positioned speech audio signal from the speech audio signals based on the steering vectors.

Extracting from the at least two audio signals the first audio signal comprising speech of the user may comprise: generating the first audio signal based on the at least two audio signals; generating an audio object representation, the audio object representation comprising the first audio signal.

Extracting from the at least two audio signals the first audio signal may further comprise analysing the at least two audio signals to determine a direction and/or position relative to the microphones associated with the speech of the user, wherein the audio object representation may further comprises the direction and/or position relative to the microphones.

Generating the second audio signal may further comprise generating binaural audio signals.

Encoding the first audio signal and the second audio signal to generate the spatial audio stream may comprise: mixing the first audio signal and the second audio signal to generate at least one transport audio signal; determining at least one directional or positional spatial parameter associated with the desired direction or position of the speech of the user; encoding the at least one transport audio signal and the at least one directional or positional spatial parameter to generate the spatial audio stream.

The method may further comprise obtaining an energy ratio parameter, and wherein encoding the at least one transport audio signal and the at least one directional or positional spatial parameter may comprise further encoding the energy ratio parameter.

The first audio signal may be a single channel audio signal.

The at least two microphones may be located on or near ears of the user.

The at least two microphones may be close microphones.

The at least two microphones may be located in an audio scene comprising the user as a first audio source and a further audio source, and the method may further comprise: extracting from the at least two audio signals at least one further first audio signal, the at least one further first audio signal comprising at least partially the further audio source; and extracting from the at least two audio signals at least one further second audio signal, wherein the further audio source is substantially not present within the at least one further second audio signal, or the further audio source is within the second audio signal.

The first audio source may be a talker and the further audio source may be a further talker.

According to a second aspect there is provided an apparatus for generating a spatial audio stream, the apparatus comprising means configured to: obtain at least two audio signals from at least two microphones; extract from the at least two audio signals a first audio signal, the first audio signal comprising at least partially speech of a user; extract from the at least two audio signals a second audio signal, wherein speech of the user is substantially not present within the second audio signal; and encode the first audio signal and the second audio signal to generate the spatial audio stream such that a rendering of speech of the user to a controllable direction and/or distance is enabled.

The spatial audio stream may further enable a controllable rendering of captured ambience audio content.

The means configured to extract from the at least two audio signals the first audio signal may further be configured to apply a machine learning model to the at least two audio signals or at least one audio signal based on the at least two audio signals to generate the first audio signal.

The means configured to apply the machine learning model to the at least two audio signals or at least one audio signal based on the at least two audio signals to generate the first audio signal may further be configured to: generate a first speech mask based on the at least two audio signals; and separate the at least two audio signals into a mask processed speech audio signal and a mask processed remainder audio signal based on the application of the first speech mask to the at least two audio signals or at least one audio signal based on the at least two audio signals.

The means configured to extract from the at least two audio signals the first audio signal may further be configured to beamform the at least two audio signals to generate a speech audio signal.

The means configured to beamform the at least two audio signals to generate the speech audio signal may be configured to: determine steering vectors for the beamforming based on the mask processed speech audio signal; determine a remainder covariance matrix based on the mask processed remainder audio signal; and apply a beamformer configured based on the steering vectors and the remainder covariance matrix to generate a beam audio signal.

The means configured to apply the machine learning model to the at least two audio signals or at least one audio signal based on the at least two audio signals to generate the first audio signal may further be configured to: generate a second speech mask based on the beam audio signal; and apply a gain processing to the beam audio signal based on the second speech mask to generate the speech audio signal.

The means configured to apply the machine learning model to the at least two audio signals or at least one signal based on the at least two audio signals to generate the first audio signal further may be configured to equalize the first audio signal.

The means configured to apply the machine learning model to the at least two audio signals or at least one audio signal based on the at least two audio signals to generate the first audio signal may be configured to generate at least one speech mask based on a trained network.

The means configured to extract from the at least two audio signals the second audio signal may be configured to: generate a positioned speech audio signal from the speech audio signals; and subtract from the at least two audio signals the positioned speech audio signal to generate the at least one remainder audio signal.

The means configured to generate the positioned speech audio signal from the speech audio signals may be configured to generate the positioned speech audio signal from the speech audio signals based on the steering vectors.

The means configured to extract from the at least two audio signals the first audio signal comprising speech of the user may be configured to: generate the first audio signal based on the at least two audio signals; generate an audio object representation, the audio object representation comprising the first audio signal.

The means configured to extract from the at least two audio signals the first audio signal may be further configured to analyse the at least two audio signals to determine a direction and/or position relative to the microphones associated with the speech of the user, wherein the audio object representation may further comprise the direction and/or position relative to the microphones.

The means configured to generate the second audio signal may further be configured to generate binaural audio signals.

The means configured to encode the first audio signal and the second audio signal to generate the spatial audio stream may be configured to: mix the first audio signal and the second audio signal to generate at least one transport audio signal; determine at least one directional or positional spatial parameter associated with the desired direction or position of the speech of the user; encode the at least one transport audio signal and the at least one directional or positional spatial parameter to generate the spatial audio stream.

The means may be further be configured to obtain an energy ratio parameter, and wherein the means configured to encode the at least one transport audio signal and the at least one directional or positional spatial parameter may be configured to further encode the energy ratio parameter.

The first audio signal may be a single channel audio signal.

The at least two microphones may be located on or near ears of the user.

The at least two microphones may be close microphones.

The at least two microphones may be located in an audio scene comprising the user as a first audio source and a further audio source, and the means may further be configured to: extract from the at least two audio signals at least one further first audio signal, the at least one further first audio signal comprising at least partially the further audio source; and extract from the at least two audio signals at least one further second audio signal, wherein the further audio source is substantially not present within the at least one further second audio signal, or the further audio source is within the second audio signal.

The first audio source may be a talker and the further audio source may be a further talker.

According to a third aspect there is provided an apparatus for generating a spatial audio stream, the apparatus comprising at least one processor and at least one memory storing instructions that, when executed by the at least one processor, cause the system at least to perform: obtaining at least two audio signals from at least two microphones; extracting from the at least two audio signals a first audio signal, the first audio signal comprising at least partially speech of a user; extracting from the at least two audio signals a second audio signal, wherein speech of the user is substantially not present within the second audio signal; and encoding the first audio signal and the second audio signal to generate the spatial audio stream such that a rendering of speech of the user to a controllable direction and/or distance is enabled.

The spatial audio stream may further enable a controllable rendering of captured ambience audio content.

The system caused to perform extracting from the at least two audio signals the first audio signal may further be caused to perform applying a machine learning model to the at least two audio signals or at least one audio signal based on the at least two audio signals to generate the first audio signal.

The system caused to perform applying the machine learning model to the at least two audio signals or at least one audio signal based on the at least two audio signals to generate the first audio signal may further be caused to perform: generating a first speech mask based on the at least two audio signals; and separating the at least two audio signals into a mask processed speech audio signal and a mask processed remainder audio signal based on the application of the first speech mask to the at least two audio signals or at least one audio signal based on the at least two audio signals.

The system caused to perform extracting from the at least two audio signals the first audio signal may further be caused to perform beamforming the at least two audio signals to generate a speech audio signal.

The system caused to perform beamforming the at least two audio signals to generate the speech audio signal may be further caused to perform: determining steering vectors for the beamforming based on the mask processed speech audio signal; determining a remainder covariance matrix based on the mask processed remainder audio signal; and applying a beamformer configured based on the steering vectors and the remainder covariance matrix to generate a beam audio signal.

The system caused to perform applying the machine learning model to the at least two audio signals or at least one audio signal based on the at least two audio signals to generate the first audio signal may further be caused to perform: generating a second speech mask based on the beam audio signal; and applying a gain processing to the beam audio signal based on the second speech mask to generate the speech audio signal.

The system caused to perform applying the machine learning model to the at least two audio signals or at least one signal based on the at least two audio signals to generate the first audio signal further may be caused to perform equalizing the first audio signal.

The system caused to perform applying the machine learning model to the at least two audio signals or at least one audio signal based on the at least two audio signals to generate the first audio signal may be caused to perform generating at least one speech mask based on a trained network.

The system caused to perform extracting from the at least two audio signals the second audio signal may be caused to perform: generating a positioned speech audio signal from the speech audio signals; and subtracting from the at least two audio signals the positioned speech audio signal to generate the at least one remainder audio signal.

The system caused to perform generating the positioned speech audio signal from the speech audio signals may be caused to perform generating the positioned speech audio signal from the speech audio signals based on the steering vectors.

The system caused to perform extracting from the at least two audio signals the first audio signal comprising speech of the user may be caused to perform: generating the first audio signal based on the at least two audio signals; generating an audio object representation, the audio object representation comprising the first audio signal.

The system caused to perform extracting from the at least two audio signals the first audio signal may further be caused to perform analysing the at least two audio signals to determine a direction and/or position relative to the microphones associated with the speech of the user, wherein the audio object representation may further comprise the direction and/or position relative to the microphones.

The system caused to perform generating the second audio signal may further be caused to perform generating binaural audio signals.

The system caused to perform encoding the first audio signal and the second audio signal to generate the spatial audio stream may be further caused to perform: mixing the first audio signal and the second audio signal to generate at least one transport audio signal; determining at least one directional or positional spatial parameter associated with the desired direction or position of the speech of the user; encoding the at least one transport audio signal and the at least one directional or positional spatial parameter to generate the spatial audio stream.

The system may be further caused to perform obtaining an energy ratio parameter, and wherein The system caused to perform encoding the at least one transport audio signal and the at least one directional or positional spatial parameter may be further caused to perform encoding the energy ratio parameter.

The first audio signal may be a single channel audio signal.

The at least two microphones may be located on or near ears of the user.

The at least two microphones may be close microphones.

The at least two microphones may be located in an audio scene comprising the user as a first audio source and a further audio source, and the system may be further caused to perform: extracting from the at least two audio signals at least one further first audio signal, the at least one further first audio signal comprising at least partially the further audio source; and extracting from the at least two audio signals at least one further second audio signal, wherein the further audio source is substantially not present within the at least one further second audio signal, or the further audio source is within the second audio signal.

The first audio source may be a talker and the further audio source may be a further talker.

According to a fourth aspect there is provided an apparatus for generating a spatial audio stream, the apparatus comprising: obtaining circuitry configured to obtain at least two audio signals from at least two microphones; extracting circuitry configured to extract from the at least two audio signals a first audio signal, the first audio signal comprising at least partially speech of a user; extracting circuitry configured to extract from the at least two audio signals a second audio signal, wherein speech of the user is substantially not present within the second audio signal; and encoding circuitry configured to encode the first audio signal and the second audio signal to generate the spatial audio stream such that a rendering of speech of the user to a controllable direction and/or distance is enabled.

According to a fifth aspect there is provided a computer program comprising instructions [or a computer readable medium comprising instructions] for causing an apparatus for generating a spatial audio stream, the apparatus caused to perform at least the following: obtaining at least two audio signals from at least two microphones; extracting from the at least two audio signals a first audio signal, the first audio signal comprising at least partially speech of a user; extracting from the at least two audio signals a second audio signal, wherein speech of the user is substantially not present within the second audio signal; and encoding the first audio signal and the second audio signal to generate the spatial audio stream such that a rendering of speech of the user to a controllable direction and/or distance is enabled.

According to a sixth aspect there is provided a non-transitory computer readable medium comprising program instructions for causing an apparatus, for generating a spatial audio stream, to perform at least the following: obtaining at least two audio signals from at least two microphones; extracting from the at least two audio signals a first audio signal, the first audio signal comprising at least partially speech of a user; extracting from the at least two audio signals a second audio signal, wherein speech of the user is substantially not present within the second audio signal; and encoding the first audio signal and the second audio signal to generate the spatial audio stream such that a rendering of speech of the user to a controllable direction and/or distance is enabled.

According to a seventh aspect there is provided an apparatus for generating a spatial audio stream, the apparatus comprising: means for obtaining at least two audio signals from at least two microphones; means for extracting from the at least two audio signals a first audio signal, the first audio signal comprising at least partially speech of a user; means for extracting from the at least two audio signals a second audio signal, wherein speech of the user is substantially not present within the second audio signal; and means for encoding the first audio signal and the second audio signal to generate the spatial audio stream such that a rendering of speech of the user to a controllable direction and/or distance is enabled.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
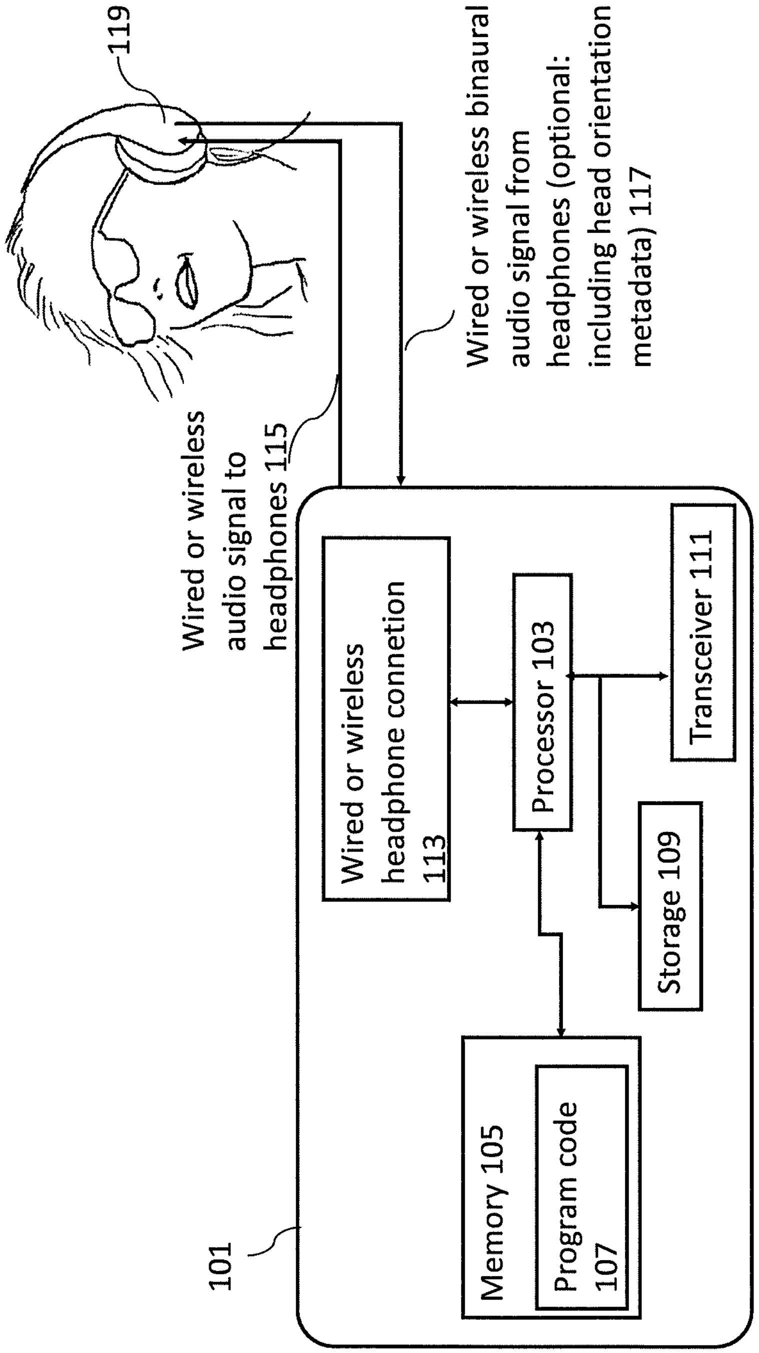
FIG. 1 shows schematically an example system of apparatus suitable for implementing some embodiments.

The following describes in further detail suitable apparatus and possible mechanisms for the generation of audio streams from captured or otherwise obtained binaural audio signals.

As discussed above Metadata-Assisted Spatial Audio (MASA) is an example of a parametric spatial audio format and representation suitable as an input format for IVAS.

It can be considered an audio representation consisting of 'N channels+spatial metadata'. It is a scene-based audio format particularly suited for spatial audio capture on practical devices, such as smartphones. The idea is to describe the sound scene in terms of time- and frequency-varying sound directions and, e.g., energy ratios. Sound energy that is not defined (described) by the directions, is described as diffuse (coming from all directions).

As discussed above spatial metadata associated with the audio signals may comprise multiple parameters (such as multiple directions and associated with each direction (or directional value) a direct-to-total ratio, spread coherence, distance, etc.) per time-frequency tile. The spatial metadata may also comprise other parameters or may be associated with other parameters which are considered to be non-directional (such as surround coherence, diffuse-to-total energy ratio, remainder-to-total energy ratio) but when combined with the directional parameters are able to be used to define the characteristics of the audio scene. For example a reasonable design choice which is able to produce a good quality output is one where the spatial metadata comprises one or more directions for each time-frequency portion (and associated with each direction direct-to-total ratios, spread coherence, distance values etc) are determined.

As described above, parametric spatial metadata representation can use multiple concurrent spatial directions. With MASA, the proposed maximum number of concurrent directions is two. For each concurrent direction, there may be associated parameters such as: Direction index; Direct-to-total ratio; Spread coherence; and Distance. In some embodiments other parameters such as Diffuse-to-total energy ratio; Surround coherence; and Remainder-to-total energy ratio are defined.

The parametric spatial metadata values are available for each time-frequency tile (the MASA format defines that there are 24 frequency bands and 4 temporal sub-frames in each frame). The frame size in IVAS is 20 ms. Furthermore currently MASA supports 1 or 2 directions for each time-frequency tile.

Example metadata parameters can be:

Format descriptor which defines the MASA format for IVAS;

Channel audio format which defines a combined following fields stored in two bytes;

Number of directions which defines a number of directions described by the spatial metadata (Each direction is associated with a set of direction dependent spatial metadata as described afterwards);

Number of channels which defines a number of transport channels in the format;

Source format which describes the original format from which MASA was created.

Examples of the MASA format spatial metadata parameters which are dependent of number of directions can be:

Direction index which defines a direction of arrival of the sound at a time-frequency parameter interval. (typically this is a spherical representation at about 1-degree accuracy);

Direct-to-total energy ratio which defines an energy ratio for the direction index (i.e., time-frequency subframe); and Spread coherence which defines a spread of energy for the direction index (i.e., time-frequency subframe).

Examples of MASA format spatial metadata parameters which are independent of number of directions can be:

Diffuse-to-total energy ratio which defines an energy ratio of non-directional sound over surrounding directions;

Surround coherence which defines a coherence of the non-directional sound over the surrounding directions;

Remainder-to-total energy ratio which defines an energy ratio of the remainder (such as microphone noise) sound energy to fulfil requirement that sum of energy ratios is 1.

Furthermore example spatial metadata frequency bands can be

| Band | LF (Hz) | HF (Hz) | BW (Hz) |
|---|---|---|---|
| 1 | 0 | 400 | 400 |
| 2 | 400 | 800 | 400 |
| 3 | 800 | 1200 | 400 |
| 4 | 1200 | 1600 | 400 |
| 5 | 1600 | 2000 | 400 |
| 6 | 2000 | 2400 | 400 |
| 7 | 2400 | 2800 | 400 |
| 8 | 2800 | 3200 | 400 |
| 9 | 3200 | 3600 | 400 |
| 10 | 3600 | 4000 | 400 |
| 11 | 4000 | 4400 | 400 |
| 12 | 4400 | 4800 | 400 |
| 13 | 4800 | 5200 | 400 |
| 14 | 5200 | 5600 | 400 |
| 15 | 5600 | 6000 | 400 |

-continued

| Band | LF (Hz) | HF (Hz) | BW (Hz) |
|---|---|---|---|
| 16 | 6000 | 6400 | 400 |
| 17 | 6400 | 6800 | 400 |
| 18 | 6800 | 7200 | 400 |
| 19 | 7200 | 7600 | 400 |
| 20 | 7600 | 8000 | 400 |
| 21 | 8000 | 10000 | 2000 |
| 22 | 10000 | 12000 | 2000 |
| 23 | 12000 | 16000 | 4000 |
| 24 | 16000 | 24000 | 8000 |

The MASA stream can be rendered to various outputs, such as multichannel loudspeaker signals (e.g., 5.1) or binaural signals.

Other options for generating a spatial audio signal is to capture an audio object using, for example, a close microphone to capture a mono audio signal and to associate or accompany the audio signal with a direction relative to a defined reference. This allows controlling the direction of the audio source in various phases of the processing: capture, mixing, and reproduction.

Yet another option for generating a spatial audio signal is to capture audio signals using stereo microphones. There are many kinds of stereo microphones. The captured stereo audio signals can be reproduced using headphones directly, providing some level of spatial aspects, depending on the placement of the microphones as well as their characteristics, such as directionality.

One option for capturing audio signals using stereo microphones is to use earbuds (or headphones in general) to capture the stereo binaural audio signals, as they are commonly used nowadays to record and playback audio. In some cases, the earbuds are used to form only a mono audio signal, but in some cases also a stereo audio signal can be captured. As the earbuds are located in the ears of a person, the resulting signals are binaural audio signals, providing spatial audio playback.

In such implementations using binaural microphones (e.g., stereo microphones mounted on earphones at the ear canal positions) enable effective spatial audio capturing. The binaural captured sound of user A may be transmitted to a remote user B wearing headphones, providing immersive perception of spatial audio, as if user B were listening at user A's position. The spatial audio contains the sound sources nearby (e.g., talkers), room reverberation, ambience, and other sounds, all positioned at their appropriate spatial positions with respect to user A.

However, when user A talks, the captured audio signals when played back to user B produces an effect that speech is perceived by user B as if the speech of user A is originating from inside the head of user B. This is unnatural, making such conventional binaural capturing unpreferable for immersive teleconferencing. Moreover, if there are multiple persons in the teleconference capturing their sound with binaural microphones, they are all perceived to originate from the same location (i.e., inside the head), making the speech intelligibility low when multiple persons talk simultaneously.

Thus, direct transmission and reproduction of binaurally captured sound is not suitable for immersive teleconferencing. However, there is a need for immersive teleconferencing using headphones with microphones, since earbuds and similar headphones containing microphones are becoming increasingly common. Being able to capture and reproduce spatial audio using just earbuds is convenient for a user in a teleconferencing use, as it does not require any extra equipment.

Although there are techniques that can extract the speech of the user as a mono signal and the mono signal transmitted and binauralized to any direction for example using head-related transfer functions (HRTFs), these techniques discard all the other spatial aspects existing in the binaural sound, such as natural reverberation in the space and/or ambient sounds. As a result, the immersion effect produced by the captured spatial audio when experienced by the listener would be decreased, as only the speech of the capture device user would be rendered, without any natural reverberation in the capture space and without any ambient sounds or other sounds at the environment.

Rendering the reverberation, the ambient sounds, and the other sounds at the environment is important in some cases, when the user, for example, wants to transmit the "feeling of being there". This experience of the event is something which the user of the capture device is typically aiming for. In some other cases, the ambience and reverberation are only needed at a modest level, especially if speech intelligibility is the most important aspect of the communication. Thus, in addition to be able to reproduce the natural reverberation and the ambient sounds of the capture space, the captured audio signals should be able to be reproduced in a controllable manner to fulfill the needs of different communication scenarios.

The concept as discussed by the embodiments herein is apparatus and methods which are configured to generate an encoded spatial audio stream enabling immersive teleconferencing for various bit rates with binaural microphones (for example those attached to headphones) where both the speech of the user is able to be appropriately spatialized (to a desired direction) and where the remaining (ambient) sounds (i.e., sounds other than the user's voice) are appropriately preserved and reproduced (with a desired level).

In some embodiments apparatus and methods are configured to generate a spatial audio stream from audio captured using microphones at or near the ears of a user (attached, e.g., in headphones). In these embodiments there is provided a processor configured to extract the speech components of the user from the captured microphone signals and also extract the remainder signal (i.e., not containing the speech of the user) from the captured microphone signals.

The embodiments as described in further detail herein achieves generation of a spatial audio stream which allows transmitting and rendering the speech of the user to a controllable direction (and distance) together with a controllable (by the user or automatically by the system) rendering of the captured ambience audio content, to enable, for example, spatial teleconferencing using headphones with microphones (e.g., earbuds).

The generation of the spatial audio stream in such embodiments extracts the speech signal as a monaural signal and generates an audio object from the monoaural signal (optionally with a default direction), extracts the remainder signal as binaural signals (i.e., the original captured binaural features are preserved), and encodes the audio object and binaural signals in order to form the spatial audio stream.

Furthermore in some embodiments there is generated a parametric spatial audio stream (transport audio signal(s) and spatial metadata) from audio captured using microphones at or near the ears of a user (attached, e.g., in headphones). In these embodiments there is provided a processor that can extract the speech of the user from the captured microphone signals and also extract the remainder signal (i.e., the audio components not containing the speech of the user) from the captured microphone signals. These speech and remainder components can then be used to generate a parametric spatial audio stream (which can be efficiently coded and rendered to various outputs including head-tracked binaural audio) where the speech of the user can be positioned to a controllable direction and the captured ambience audio content can be added in a controllable (by the user or automatically by the system) manner to enable, e.g., spatial teleconferencing using headphones with microphones (e.g., earbuds).

In some embodiments the apparatus is configured to encode speech and ambience separately (for example by separately encoding audio objects and ambience binaural). In such embodiments the controllable direction of speech and controllable ambience audio content is enabled (if not necessarily implemented or employed) and are controlled at a remote decoder. However in some embodiments the control of speech and ambience is implemented at the encoder device. In such embodiments after implementing the control (modifications), the controlled or modified speech and ambience are conveyed to the remote, perhaps in a mixed form (MASA). In such embodiments controlling the direction and the ambience at the remote device may not be implemented.

These embodiments are configured to achieve this by extracting the speech signal as a monaural signal and extracting the remainder signal as a stereo signal, determining parametric spatial metadata using the extracted signals and at least one control (e.g., the desired direction), mixing the audio signals to produce transport audio signals, and determining the spatial audio stream based on the spatial metadata and the transport audio signals.

In the description herein the term "audio signal" may refer to an audio signal having one channel or an audio signal with multiple channels. When it is relevant to specify that a signal has one or more channels, it is stated explicitly. Furthermore, the term "audio signal" can mean that the signal is in any form, such as an encoded or non-encoded form, e.g., a sequence of values defining a signal waveform or spectral values.

With respect to FIG. 1 is shown an example apparatus for implementing some embodiments. In the example shown in FIG. 1, there is shown a mobile phone 101 coupled via a wired or wireless connection 113 with headphones 119 worn by the user of the mobile phone 101. In the following the example device or apparatus is a mobile phone as shown in FIG. 1. However the example apparatus or device could also be any other suitable device, such as a tablet, a laptop, computer, or any teleconference device. The apparatus or device could furthermore be the headphones itself so that the operations of the exemplified mobile phone 101 are performed by the headphones.

In this example the mobile phone 101 comprises a processor 103. The processor 103 can be configured to execute various program codes such as the methods such as described herein. The processor 103 is configured to communicate with the headphones 119 using a wired or wireless headphone connection 113. In some embodiments the wired or wireless headphone connection 113 is a Bluetooth 5.3 or Bluetooth LE Audio connection. The connection 113 provides from a processor 103 a two-channel audio signal 115 to be reproduced to the user with the headphones. The connection 113 also provides from the headphones 119 a two-channel audio signal 117 to the processor 103, where the two audio signals originate from microphones at the headphones near the left and right ears of the user. There may be one or more microphones at each earpiece of the headphones, from which the two audio signals are derived.

The headphones 119 could be over-ear headphones as shown in FIG. 1, or any other suitable type such as in-ear, or bone-conducting headphones, or any other type of headphones. In some embodiments, the headphones 119 have a head orientation sensor providing head orientation information to the processor 103. In some embodiments, a head-orientation sensor is separate from the headphones 119 and the data is provided to the processor 103 separately. In further embodiments, the head orientation is tracked by other means, such as using the device 101 camera and a machine-learning based face orientation analysis. In some embodiments, the head orientation is not tracked.

In some embodiments the processor 103 is coupled with a memory 105 having program code 107 providing processing instructions according to the following embodiments. The program code 107 has instructions to process the binaural audio signal 117 captured by the microphones at the headphones 119 to a processed form suitable for effective encoding and immersive decoding at a remote apparatus. These processed audio signals are provided from the processor 103 to a transceiver 111 to the remote decoding apparatus, and/or in some cases, stored to the storage 109 for later use.

The transceiver can communicate with further apparatus by any suitable known communications protocol. For example in some embodiments the transceiver can use a suitable radio access architecture based on long term evolution advanced (LTE Advanced, LTE-A) or new radio (NR) (or can be referred to as 5G), universal mobile telecommunications system (UMTS) radio access network (UTRAN or E-UTRAN), long term evolution (LTE, the same as E-UTRA), 2G networks (legacy network technology), wireless local area network (WLAN or Wi-Fi), worldwide interoperability for microwave access (WiMAX), Bluetooth®, personal communications services (PCS), Zig Bee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

The program code 107 may also include trained machine-learning network(s). A machine learning network, at the inference time, is essentially a multitude of defined processing steps, and is thus fundamentally not dissimilar to the processing instructions related to conventional program code. The difference is that the instructions of the conventional program code are at the programming time defined more explicitly. The machine-learning networks, on the other hand, are defined by combining a set of predefined processing blocks (e.g., convolutions, data normalizations, other operators), where the weights of the network are unknown at the network definition time. Then the weights of the network are optimized by providing the network with a large amount of input and reference data, and the network weights then converge so that the network learns to solve the given task. Nevertheless, at the runtime (at the apparatus 101 of FIG. 1), the networks are fixed, and thus correspond to any other program code in a sense that they are simply composed of a set of processing instructions.

The remote receiver (or playback device) of the processed audio bit stream may be a system similar to or exactly like the apparatus and headphones system shown in FIG. 1. In the playback device, the encoded audio signal from a transceiver is provided to a processor to be decoded and rendered to binaural spatial sound to be forwarded (with the wired or wireless headphone connection) to headphones to be reproduced to the listener (user).

Additionally with respect to the playback device there may be head tracking involved. In this case, the playback device processor receives the head orientation information from the listener (user), and the processing is altered based on the head orientation information, as is exemplified in the following embodiments.

In some embodiments the device comprises a user interface (not shown) which can be coupled in some embodiments to the processor. In some embodiments the processor can control the operation of the user interface and receive inputs from the user interface. In some embodiments the user interface can enable a user to input commands to the device, for example via a keypad. In some embodiments the user interface can enable the user to obtain information from the device. For example the user interface may comprise a display configured to display information from the device to the user. The user interface can in some embodiments comprise a touch screen or touch interface capable of both enabling information to be entered to the device and further displaying information to the user of the device. In some embodiments the user interface may be the user interface for communicating.

Figure 2:
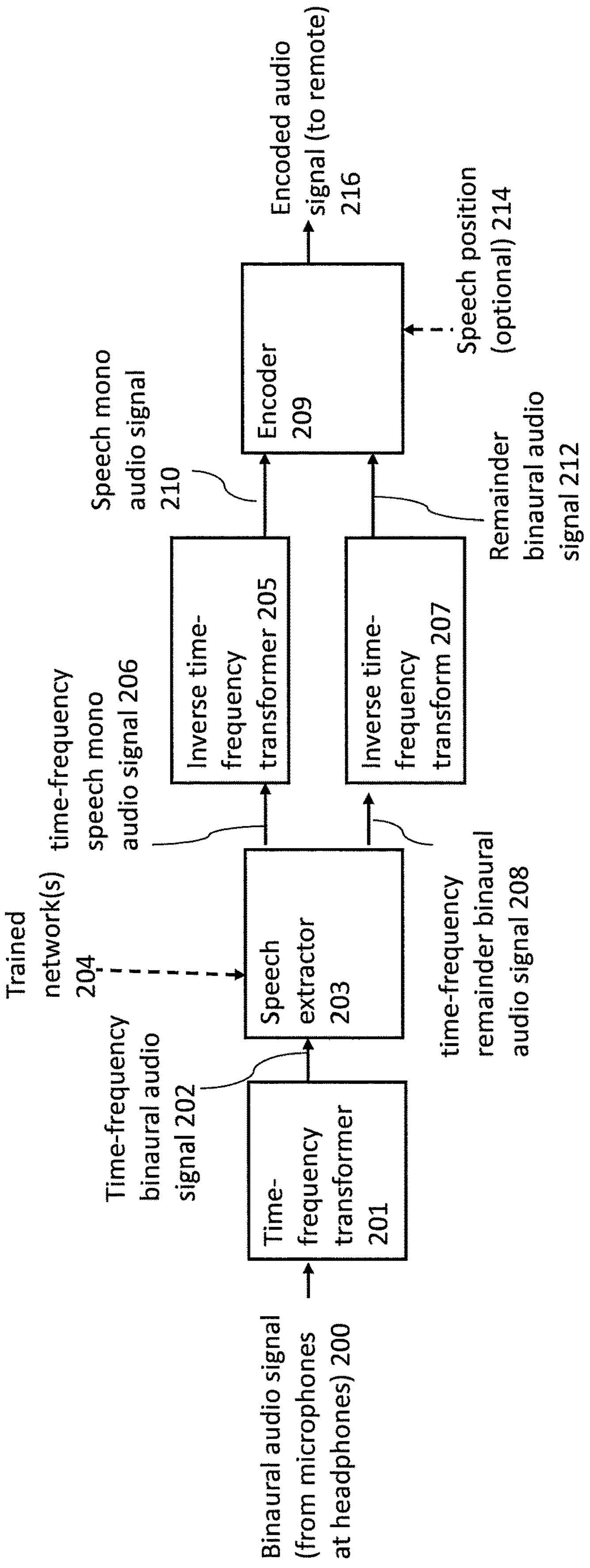
FIG. 2 shows schematically an example capture apparatus suitable for implementing some embodiments.
Figure 6:
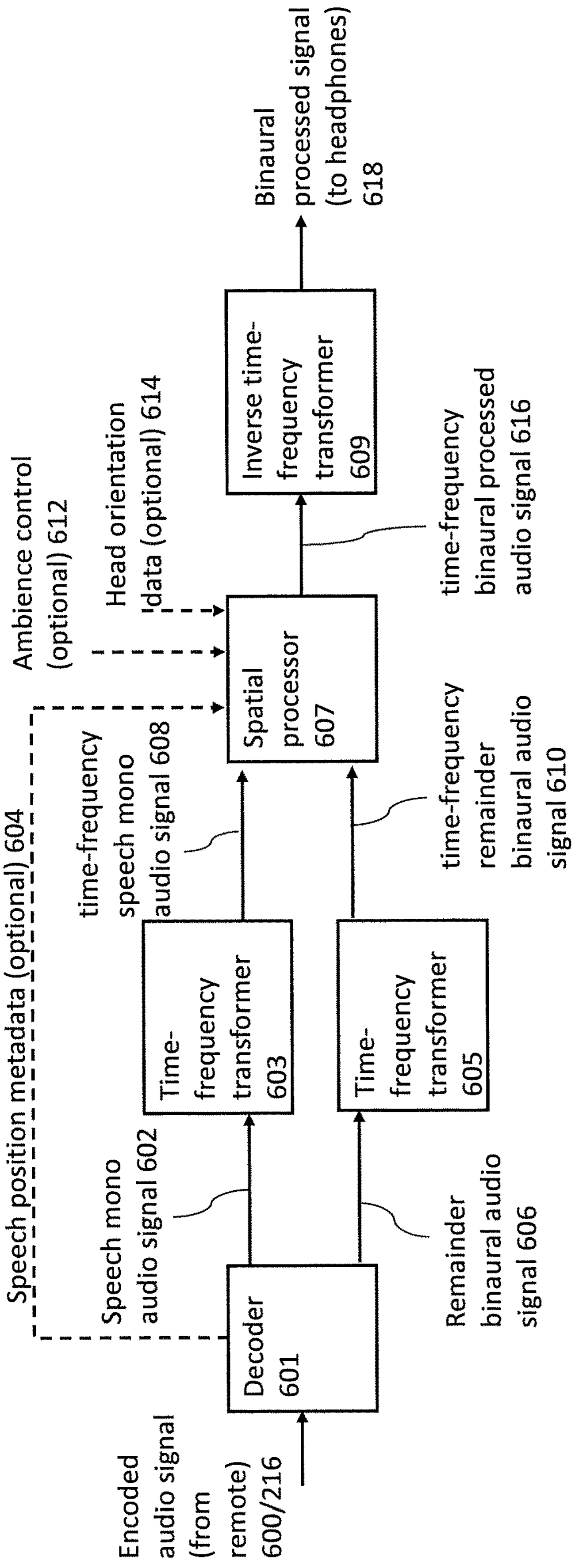
FIG. 6 shows schematically an example playback apparatus suitable for implementing some embodiments.

With respect to FIG. 2 is shown a schematic view of the processor 103 with respect to a capture aspect, where an encoded bit stream is generated based on the captured binaural audio signals from the headphones 119. FIG. 6 furthermore shows a schematic view of the processor with respect to a corresponding remote decoder/playback apparatus. It is understood that in some embodiments a single apparatus can perform processing according to FIG. 2, as well as FIG. 6, when receiving another encoded spatial audio stream back from a remote device.

In some embodiments as shown in FIG. 2, the processor is configured to receive as an input the binaural audio signal 200, obtained from the microphones at the headphones 119 as shown in FIG. 1.

The processor 103 furthermore in some embodiments comprises a time-frequency transformer 201, configured to receive the binaural audio signal 200 and transform them to generate a time-frequency binaural audio signal 202. In some embodiments the time-frequency transformer 201 is implemented by a short-time Fourier transform (STFT) configured to take a frame of 1024 samples of the microphone audio signal(s), concatenating this frame with the previous 1024 samples, applying a square-root of the 2*1024 length Hann window to the concatenated frames, and applying a fast Fourier transform (FFT) to the result. In other embodiments other time-frequency transforms (such as complex-modulated quadrature mirror filter bank) or a low-delay variant thereof can be employed. The time-frequency binaural audio signal(s) 202 can be denoted S(b, n, i) where b is a frequency bin index, n is the time index and i is the channel index. The time-frequency binaural audio signals 202 furthermore can be denoted in a column vector form $$s(b, n) = \begin{bmatrix} S(b, n, 1) \\ S(b, n, 2) \end{bmatrix}$$

The processor in some embodiments further comprises a speech extractor 203. The speech extractor 203 is configured to receive the time-frequency binaural audio signal 202 and generate a speech mono time-frequency audio signal 206 and a remainder binaural time-frequency audio signal 208. In the following examples the speech extractor 203 is configured to use a trained network(s) 204 (which can be stored in the memory of the device) to extract from the time-frequency binaural audio signal 202 the speech mono time-frequency audio signal 206 and time-frequency remainder binaural audio signal 208, which is the binaural audio signal with the speech audio signal substantially removed or attenuated. However in some embodiments other speech detection and extraction methods can be applied.

In the following examples, the term speech in time-frequency speech mono audio signal 206 refers to the speech of the person wearing the headphones with microphones, whereas other talkers nearby are considered part of the time-frequency remainder binaural audio signal 208. In other embodiments, at least one further talker (nearby the user) are captured within the time-frequency speech mono audio signal 206. The time-frequency speech mono audio signal 206 and the time-frequency remainder binaural audio signal 208 are provided to the inverse time-frequency transformers 205, 207.

In some embodiments the processor comprises an inverse time-frequency transformer 205 configured to receive the time-frequency speech mono audio signal 206 and apply an inverse transform corresponding to the one applied at the time-frequency transformer 201 to generate a speech mono audio signal 210.

Additionally the processor can comprise a further inverse time-frequency transformer 207 configured to receive the time-frequency remainder binaural audio signal 208 and apply an inverse transform corresponding to the one applied at the time-frequency transformer 201 to generate a remainder binaural audio signal 212.

As the inverse time-frequency transformers apply the inverse transform corresponding to the one applied at the time-frequency transformer 201 the implementation may also correspond, for example the inverse transformer can be inverse STFT where the transformer was a STFT. The speech mono audio signal 210 and the remainder binaural audio signal 212 can then be provided to the encoder 209.

In some embodiments the processor further comprises an encoder 209. The encoder 209 is configured to receive and encode the received speech mono audio signal 210 and the remainder binaural audio signal 212 to generate an encoded audio signal 216 that can be output.

In some embodiments the encoder 209 is further configured to obtain a speech position 214 input which can be embedded into the encoded audio signal 216.

Any suitable encoder can be employed as the encoder. For example an IVAS encoder can be used to implement the functionality of the encoder 209. The speech mono audio signal 210 together with the optional speech position 214 may be encoded as an audio object, and the remainder binaural audio signal 212 can be encoded as a stereo signal. In this example case, the encoded audio signal 216 is an IVAS bit stream.

In some embodiments the speech mono audio signal 210 and the two channels of the remainder binaural signal 212 can be encoded using individual instances of the enhanced voice services (EVS) (i.e., there are three channels to be encoded), and the resulting bit streams may be embedded together to form the encoded audio signal 216. The speech position 214 may also be embedded in the stream, or it may be left out and not encoded or sent (in which case the speech position can be determined in the decoder/playback device).

The encoded audio signal 216 can then be output from the encoder 209 and is provided to a remote decoder using the transceiver 111.

Figure 3:
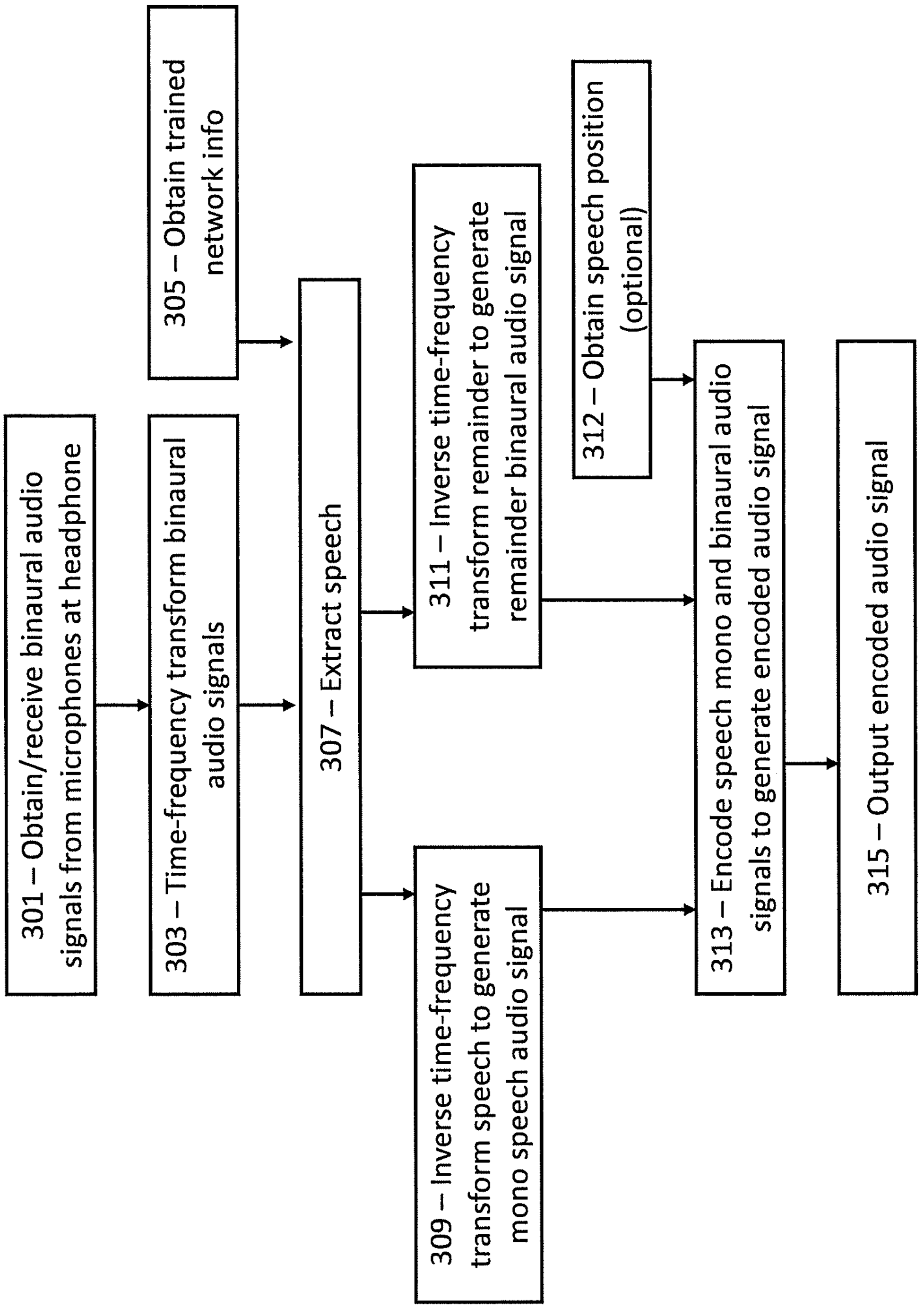
FIG. 3 shows a flow diagram of the operation of the example capture apparatus shown in FIG. 2 according to some embodiments.

With respect to the FIG. 3 an example flow diagram showing the operations of the processor shown in FIG. 2 is shown according to some embodiments.

The processor can receive the binaural audio signal from the microphones as shown by 301.

The binaural audio signal can be transformed into a time-frequency binaural audio signal as shown by 303.

The method may then comprise obtaining the trained network information (for extracting the speech components) as shown by 305.

The speech components can then be extracted and a time-frequency speech mono audio signal and a time-frequency remainder binaural audio signal generated as shown by 307.

The time-frequency speech mono audio signal and a time-frequency remainder binaural audio signal can then be inverse time-frequency transformed as shown by 309 and 311.

Furthermore optionally the speech position and or direction is obtained as shown by 312.

The time domain speech mono audio signal and binaural audio signals (and speech position/direction) can then be encoded as shown in 313.

Finally the encoded audio signals are output as shown by 315.

Figure 4:
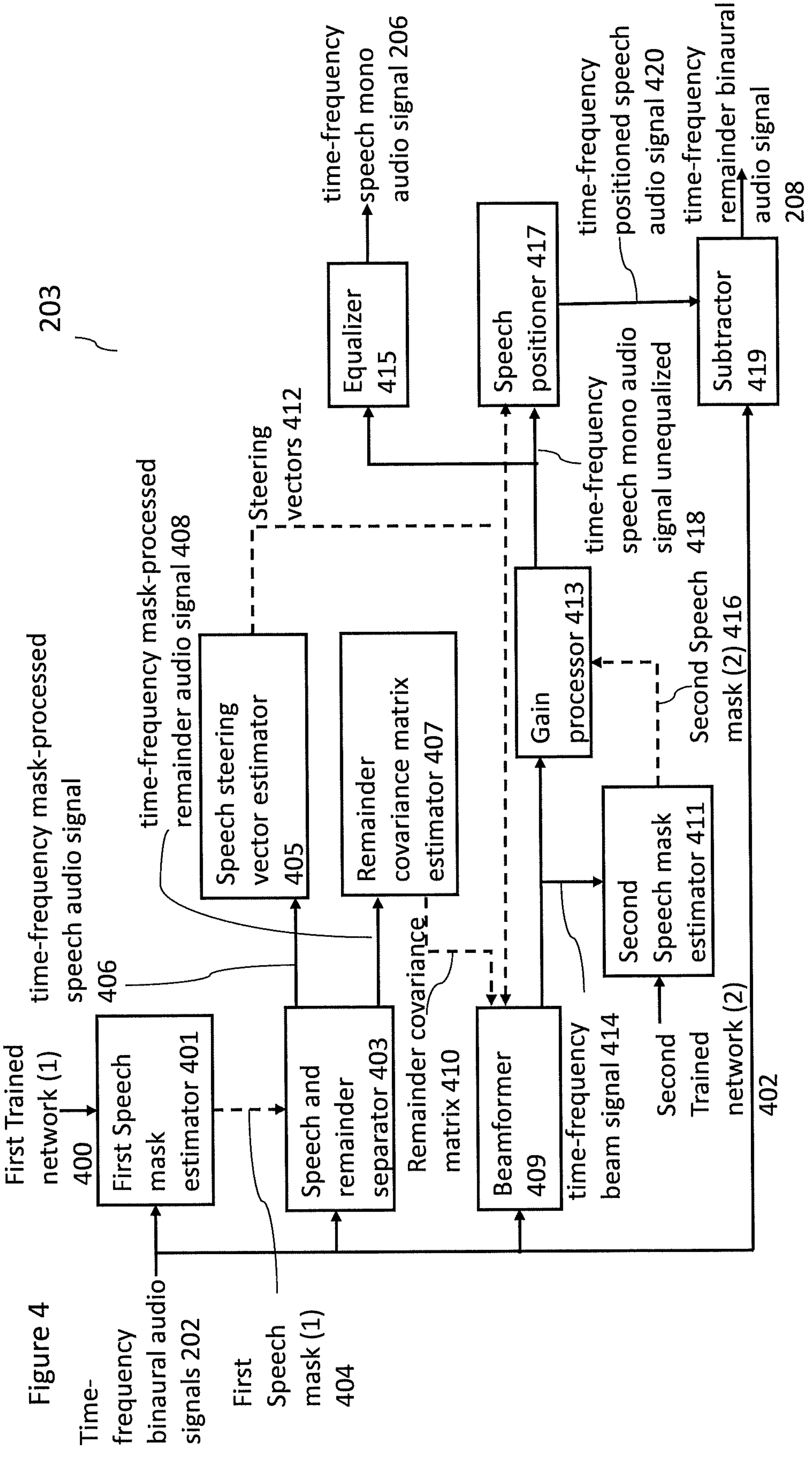
FIG. 4 shows schematically a speech extractor as shown in the capture apparatus as shown in FIG. 2 according to some embodiments.

With respect to FIG. 4 is shown an example implementation of the speech extractor 203 shown in FIG. 2 according to some embodiments.

As described previously the speech extractor 203 is configured to perform extraction of speech of the person wearing the headphones from the time-frequency binaural audio signals 202. The speech can furthermore be equalized to account for the speech being from the person wearing the headphones and as such the speech spectrum is impaired when compared to conventional recordings. The speech extractor further can be configured to provide the remainder signal where the speech (of the person wearing the headphones) has been substantially removed.

In the example below beamforming is used to extract the speech, but that simpler techniques are also applicable to extract the speech signal. The presented implementation aims to provide the benefit that the inter-channel relationships between the speech signal (and the remainder signal) can be anything, and the method can nevertheless extract the speech and remainder outputs. For example, a system that would assume that the main talker binaural captured speech sound would be phase-matching at both channels due to the headphone symmetry would have a reduced performance when the user has removed one side of (overhead) headphones away from the ear or removed one earbud (for example for the talker to hear something that occurs in their audio scene directly).

In some embodiments the speech extractor 203 comprises a first speech mask estimator 401. The first speech mask estimator 401 is configured to receive the time-frequency binaural audio signals 202 along with a first trained network 400 input. In some embodiments the first trained network 400 and the later described second trained network 402 are the same trained network and are described in further detail later on, however, in some embodiments these networks may be different, or differently trained. The first speech mask estimator 401 is configured to first estimate the network input data I(n, k), which is a normalized spectrogram in decibels in a logarithmic frequency scale. First, the energy is estimated by $$E_{dB}(n,k)=10\log_{10}\sum_{b=b_{low}(k)}^{b_{high}(k)}\sum_{i=1}^{2}|S(b,n,i)|^2$$

where $b_{low}(k)$ and $b_{high}(k)$ are the indices for the lowest and highest frequency bins of frequency band k. The frequency bands can, e.g., follow ERB or Bark scales, or any other suitable scales such as 96 bands at a logarithmic scale as is provided in this example.

The first speech mask estimator 401 is then configured to obtain a max value $E_{dB\_max}(n, k)$, for example by keeping the values $E_{dB}(n, k)$ over the last 64 temporal indices (i.e., for range n-63, . . . , n), and selecting the largest of them, for each band independently. Also obtained is the lower limited $E'_{dB}(n, k)$ which can be formulated by $$E'_{dB}(n,k)=\max(E_{dB}(n,k),E_{dB\_max}(n,k)-60)$$

Then, a mean is formulated by $$E_{dB\_mean}(n,k)=(1-\alpha)E'_{dB}(n,k)+\alpha E'_{dB\_mean}(n-1,k)$$

where α is an IIR averaging factor, for example 0.99, and $E'_{dB\_mean}(0, k)=0$.

A variance can furthermore be formulated by $$E_{dB\_var}(n,k)=(1-\alpha)[E'_{dB}(n,k)-E'_{db_{mean}}(n,k)]^2+\alpha E'_{dB\_var}(n-1,k)$$

where and $E'_{dB\_var}(0, k)=0$.

The standard deviation can be determined as $$E'_{dB\_std}(n,k)=\sqrt{E'_{dB\_var}(n,k)}$$

The network input data then is $$I(n,k)=\frac{E'_{dB}(n,k)-E'_{dB\_mean}(n,k)}{E'_{dB\_std}(n,k)}$$

The network input data is processed with the first trained network 400. The details of training the network, at an offline stage, is described later.

The first trained network generates, based on I(n, k), an output $O_1(n, k)$, which is the first speech mask (speech mask (1)) provided to the speech and remainder separator 403.

In some embodiments, the mask is modified so that the speech mask emphasizes the talker's voice who is wearing the microphones and de-emphasizes any other talkers. This could be implemented by monitoring the time-frequency binaural signal S(b, n, i) at the time-frequency instances where $O_1(n, k)$ is large, and then reducing $O_1(n, k)$ to zero or towards zero when the cross-correlation analysis of S(b, n, i) indicates that the coherent component between the channels is significantly away from centre (i.e., significantly not in phase). In some embodiments a similar processing can be employed also at a later stage where a network estimates a second speech mask $O_2(n, k)$. In some embodiments, the network may have been trained to distinguish the main talker wearing headphones and consider the other talkers as "not speech", for example, by utilizing the spectral differences between these differing talkers.

In some embodiments the input of the example first trained network is all spectral values and 20 latest time indices of I(n, k). In other words, the first speech mask estimator 401 is configured to store this data to be made available to be processed with the network.

In some embodiments the speech extractor 203 further comprises a speech and remainder separator 403 configured to receive the first speech mask $O_1(n, k)$ 404 and the time-frequency binaural audio signal S(b, n, i) 202 and generates a time-frequency mask-processed speech audio signal 406 by $$S_{speechM}(b,n,i)=S(b,n,i)O_1(n,k)$$

where band k is the band where bin b resides. The speech and remainder separator 403 is also configured to generate a time-frequency mask-processed remainder audio signal 408 by $$S_{remainderM}(b,n,i)=S(b,n,i)(1-O_1(n,k))$$

where band k is the band where bin b resides.

In some embodiments the speech extractor 203 comprises a speech steering vector estimator 405 configured to receive the time-frequency mask-processed speech audio signal 406 and estimates a steering vector 412 based on it. First, a speech covariance matrix is formulated by $$C_s(b,n)=(1-\gamma_s)s_{speechM}(b,n)s_{spe}^H(b,n)+\gamma_s C_s(b,n-1)$$

where $\gamma_s$ is a temporal smoothing coefficient (having, e.g., the value of 0.8), $C_s(b, 0)$ may be a matrix of zeros, and $s_{spe}(b, n)$ is a column vector having the channels of signal $S_{spe}(b, n, i)$ at its rows. Then, the speech steering vector estimator 405 can be configured to apply an eigendecomposition to $C_s(b, n)$, and obtains the eigenvector u(b, n) that corresponds to the largest eigenvalue. Then, the eigenvector is normalized with respect to its first channel by $$v(b,n)=\frac{u(b,n)}{U(b,n,1)}$$

where U (b, n, 1) is the first row entry of u(b, n). Vector v(b, n) is then the estimated steering vector of the speech signal and contains the steering vector values V(b, n, i) at its rows. The steering vector 412 can then be output. In the disclosure both the vector form v(b, n) as well as the entry form V(b, n, i) is used to denote the steering vector.

In some embodiments the speech extractor 203 comprises a remainder covariance matrix estimator 407 configured to receive the time-frequency mask-processed remainder audio signal 408 and estimate a remainder covariance matrix 410 based on it by $$C_r(b,n)=(1-\gamma_r)s_{remainderM}(b,n)s_{remainderM}^H(b,n)+\gamma_r C_r(b,n-1)$$

where $\gamma_r$ is a temporal smoothing coefficient (having, e.g., the value of 0.8), $C_r(b, 0)$ may be a matrix of zeros and $s_{remainderM}(b, n)$ is a column vector having the channels of signal $S_{remainderM}(b, n, i)$ at its rows. The remainder covariance matrix $C_r(b, n)$ 410 can then be output.

In some embodiments the speech extractor 203 comprises a beamformer 409 configured to receive the time-frequency binaural audio signals 202, the steering vectors 412 and the remainder covariance matrix 410 and performs beamforming on the time-frequency binaural audio signals 202. The beamformer 409 in some embodiments is configured to apply, for example, the known MVDR formula to obtain beamforming weights $$w(b,n) = C_r^{-1}(b,n)\frac{v(b,n)}{v^H(b,n)C_r^{-1}(b,n)v(b,n)}$$

In some embodiments, the matrix inverse $$C_r^{-1}(b,n)$$

may be a regularized one, for example, by using diagonal loading. Then, the beamformer 409 is configured to apply the beamform weights to the time-frequency signal by $$S_{beam}(b,n)=w^H(b,n)s(b,n)$$

where s(b, n) is a column vector having the channels of signal S(b, n, i) at its rows. The beamformer 409 is configured to output a time-frequency beam audio signal $S_{beam}$(b, n) 414.

In some embodiments the speech extractor 203 comprises a second speech mask estimator 411 configured to receive the time-frequency beam audio signal $S_{beam}$(b, n) 414 and the second trained network 402 (trained network (2)). As described previously, the second trained network 402 and the first trained network 400 may be the same trained network. The operation of the second speech mask estimator 411 can be the same as that of first speech mask estimator 401, except for that the input signal is different and it has only one channel. The second speech mask estimator 411 is then configured to output a second speech mask $O_2$(n, k) 416 as its output.

In some embodiments the speech extractor 203 comprises a gain processor 413 configured to receive the time-frequency beam audio signal $S_{beam}$(b, n) 414 and the second speech mask $O_2$(n, k) 416. The gain processor 413 is configured to process the time-frequency beam audio signal 414 with the mask in the same way as the block speech and remainder separator 403 processed the time-frequency binaural audio signals 202 with the first speech mask 404 when generating the time-frequency mask-processed speech audio signal 406. As such the processing can be described by $$S_{speech\_mono}(b,n)=S_{beam}(b,n)O_2(n,k).$$

where band k is the band where bin b resides. $S_{speech\_mono}$(b, n) is the time-frequency speech mono audio signal unequalized 418 and it is then output.

In some embodiments the speech extractor 203 comprises a speech positioner 417 configured to obtain time-frequency speech mono audio signal unequalized $S_{speech\_mono}$(b, n) 418 and the steering vectors V(b, n, i) 412 and generates a time-frequency positioned speech audio signal 420 by $$S_{speech\_pos}(b,n,i)=S_{speech\_mono}(b,n)V(b,n,i)$$

The time-frequency positioned speech audio signal 420 can then be provided to a subtractor 419.

In some embodiments the speech extractor 203 comprises a subtractor 419 configured to receive the time-frequency positioned speech signal $S_{speech\_pos}$(b, n, i) 420 and the time-frequency binaural audio signals S(b, n, i) 202, and generate a time-frequency remainder binaural audio signals $S_{remainder}$(b, n, i) 208 (which is denoted $s_{remainder}$(b, n) in vector form) by $$S_{remainder}(b,n,i)=S(b,n,i)-S_{speech\_pos}(b,n,i)$$

The output of the subtractor 419 is therefore the time-frequency remainder binaural audio signal $s_{remainder}$(b, n) 208.

In some embodiments the speech extractor 203 comprises an equalizer 415 configured to receive the time-frequency speech mono audio signal unequalized $S_{speech\_mono}$(b, n) 418 and apply predetermined equalizing gains to it $$S_{speech}(b,n)=g_{main}(b)S_{spe\_mono}(b,n)$$

where $g_{main}$(b) is the main talker (user wearing the headphones with binaural microphones) equalization gains. The gains $g_{main}$(b) may have been determined by recording speech with the binaural microphones and the same speech with an external reference microphone with flat frequency characteristics in front of the talker, and then finding equalization gains $g_{main}$(b) that fit the spectrum of the first to the second. The time-frequency speech mono audio signal $S_{speech}$(b, n) 206 is then output from the equalizer.

Figure 5:
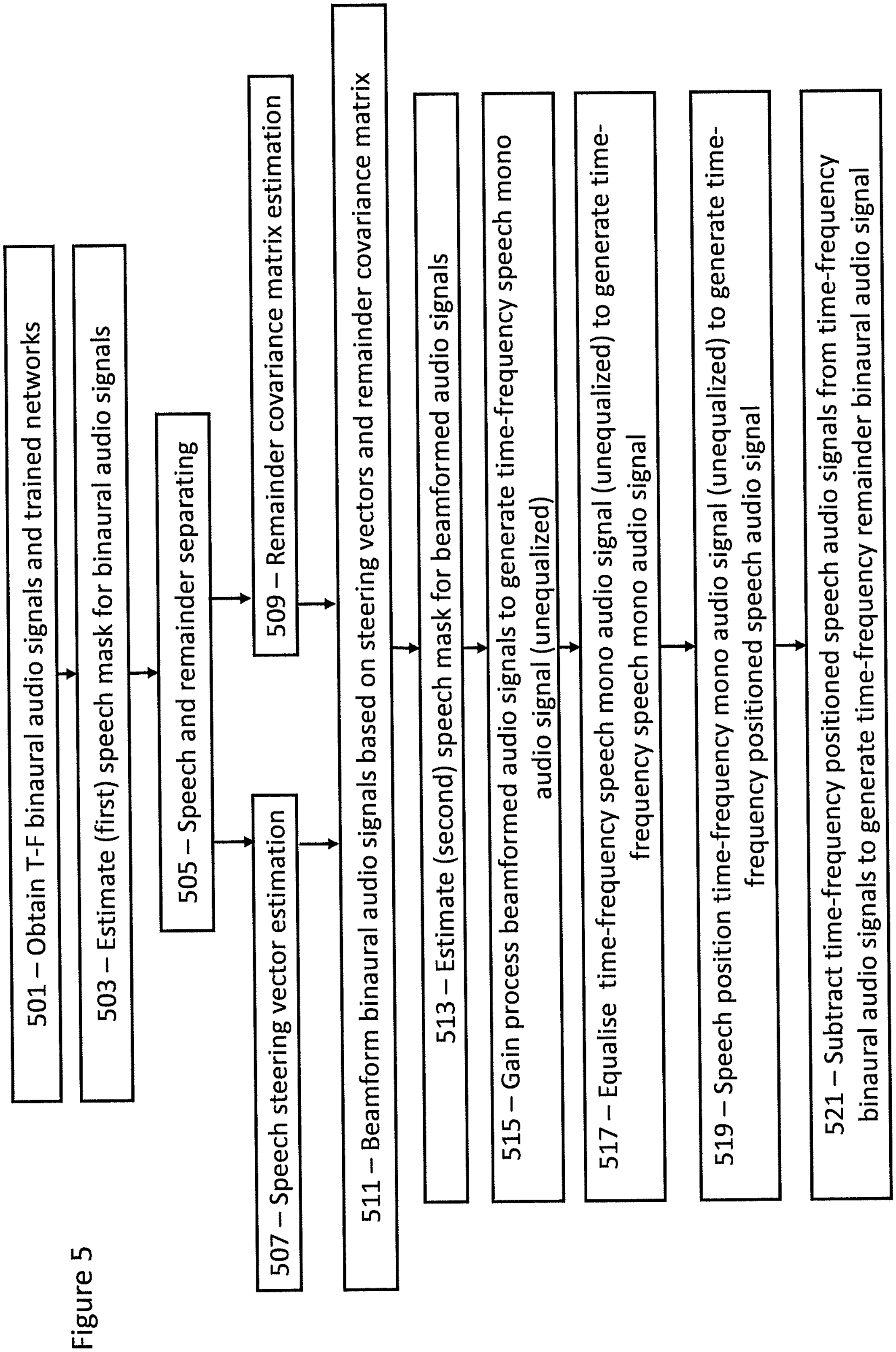
FIG. 5 shows a flow diagram of the operation of the example speech extractor shown in FIG. 4 according to some embodiments.

With respect to FIG. 5 a flow diagram of the operation of the example speech extractor shown in FIG. 4 is shown according to some embodiments.

As shown by 501 the time-frequency binaural audio signals and the trained networks are obtained or received.

The (first) speech mask for the time-frequency binaural audio signals is then estimated as shown by 503.

The speech and remainder components are then separated based on the application of the first speech mask to the time-frequency binaural audio signals as shown by 505.

The speech steering vector is then estimated as shown in 507.

Furthermore the remainder covariance matrix is estimated as shown in 509.

As shown by 511 the method then able to beamform the time-frequency binaural audio signals based on steering vectors and remainder covariance matrix.

The (second) speech mask for the time-frequency beamformed audio signals is then estimated as shown by 513.

The time-frequency beamformed audio signals are then gain processed based on the second speech mask to produce time-frequency speech mono audio signal (unequalized) as shown by 515

The time-frequency speech mono audio signal (unequalized) is then equalised to generate time-frequency speech mono audio signal as shown by 517.

The time-frequency speech mono audio signal (unequalized) is furthermore positioned based on the steering vector as shown by 519.

These time-frequency positioned speech audio signals are subtracted from time-frequency binaural audio signals to generate time-frequency remainder binaural audio signal as shown by 521.

With respect to FIG. 6 is shown a schematic view of the processor shown in FIG. 1 operating as a receiver/play-back apparatus or device.

In some embodiments the receiver comprises a decoder configured to receive or obtain the encoded audio signal 600 (which as shown in FIG. 2 can be the encoded audio signal sent to the remote designated reference 216) and is further configured to decode the encoded audio signal 600 to generate a speech mono audio signal 602 and remainder binaural audio signal 606. In some embodiments the decoder 601 is further optionally configured to generate speech position metadata 604.

The receiver can furthermore in some embodiments comprise time-frequency transformers 603, 605 which are configured to receive the speech mono audio signal 602 and remainder binaural audio signal 606 and generate time-frequency speech mono audio signal 608 and time-frequency remainder binaural audio signal 610.

Furthermore the receiver can comprise a spatial processor 607. The spatial processor 607 is configured to receive the time-frequency speech mono audio signal 608 and time-frequency remainder binaural audio signal 610. Additionally, and optionally in some embodiments the spatial processor 607 is configured to receive speech position metadata 604, ambience control 612 and head orientation data 614.

When the received speech position metadata is not available or not used, the spatial processor is configured to set the speech source at a defined direction or position relevant for the listener. This predetermined or default direction or position can be, for example, at a front direction, a direction of a screen, a direction of a portion of the screen where the talker image resides. The direction may be also defined or set in any other suitable way, such as manually by the (listener) user. Therefore, the sound direction DOA(n) is available, either from speech position metadata 604 or otherwise.

Also when the head orientation data 614 is available, it may be used to rotate the DOA(n) value to account for the head movement. For example, when DOA(n) points to front (0 degrees), when the user rotates a head left by 90 degrees, then DOA(n) is changed to −90 degrees. In addition to yaw, the rotation may also include pitch and roll axes, and also movement in a 6DOF sense, for example when the user moves sideways with respect to the computer screen, the direction is then updated accordingly.

In the following representation $S_{speec}$ (b, n) is the time-frequency speech mono audio signal 608. Note that due to the encoding and decoding the speech signal may differ from the speech signal prior to encoding. However, the signal is substantially the same, so the same notation is used for clarity. The time-frequency remainder binaural audio signal 610 is furthermore denoted $S_{remainder}$(b, n). Similarly due to the encoding and decoding the time-frequency remainder binaural audio signal may differ from the time-frequency remainder binaural audio signal prior to encoding. However, as above, the two audio remainder audio signals are substantially the same, so the same notation is used for clarity. The time-frequency binaural processed audio signal 616 may be generated by $$s_{binaural}(b,n)=g_s h(b,\mathrm{DOA}(n))S_{spee}(b,n)+g_r s_{remainder}(b,n)$$

where $g_s$ and $g_r$ are gains that may be used to control the levels of the speech and remainder sounds, for example, as function of the desired distance of the speech sound, or in terms of optimizing the clarity of speech. h(b, DOA(n)) refers to the head-related transfer functions (HRTFs) for bin b and DOA(n). It is a column vector with two rows having left and right complex HRTF gains at its rows. The time-frequency binaural processed audio signal 616 can then be provided to an inverse time-frequency transformer 609.

In some embodiments the receiver comprises an inverse time-frequency transformer configured to output the binaural processed signal 618 that is provided to the headphones to be played back to the user.

In some embodiments, the spatial processor 607 is configured to control the levels of the speech and the remainder parts, e.g., the gains $g_s$ and $g_r$ based on the ambience control 612. This ambience control 612 information may be obtained from the user, or it may be obtained, e.g., automatically from the playback device. In other embodiments, default values stored in the spatial processor may be used.

Figure 7:
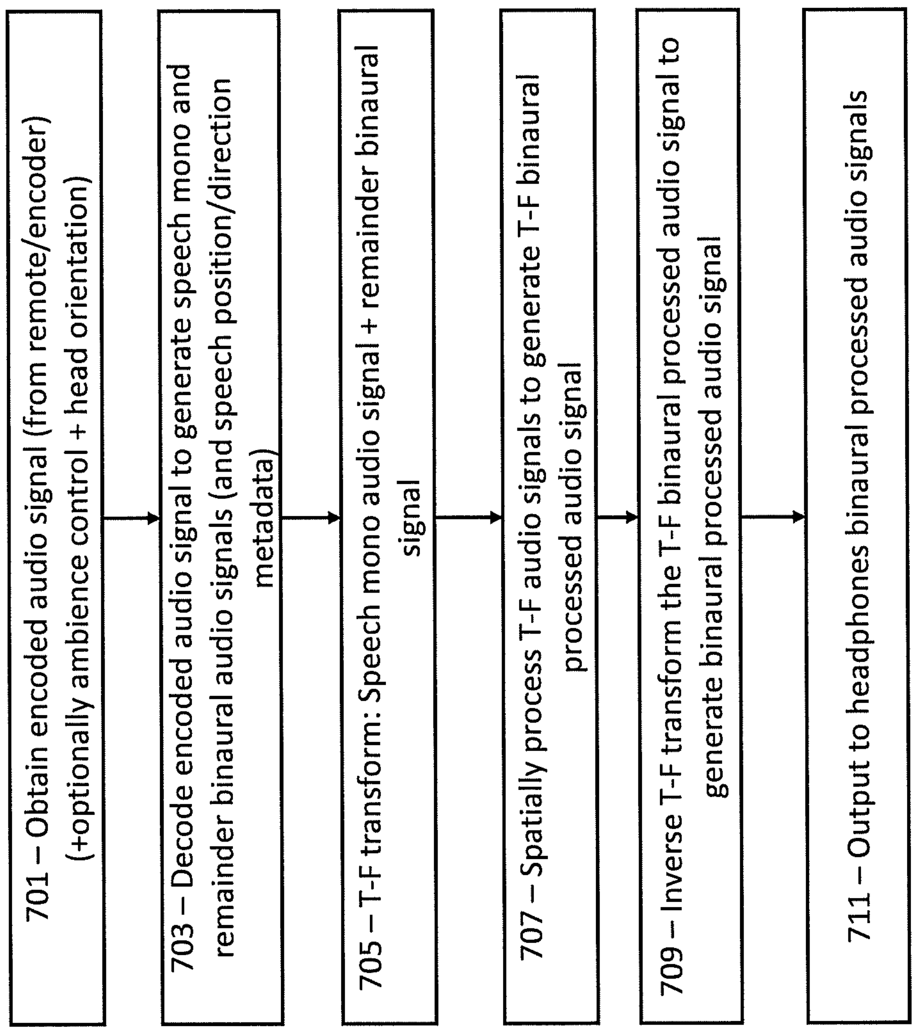
FIG. 7 shows a flow diagram of the operation of the example playback apparatus shown in FIG. 6 according to some embodiments.

Furthermore with respect to FIG. 7 is shown a flow diagram of the operations of the example apparatus shown in FIG. 6 according to some embodiments.

Thus as shown by 701 there is obtaining an encoded audio signal (from an encoder or as also described above the remote device) and optionally also obtaining other inputs such as ambience control and head orientation.

Then as shown by 703 there is decoding the obtained encoded audio signal to generate speech mono and remainder binaural audio signals (and optionally the speech position/direction metadata).

Speech mono audio signal and the remainder binaural audio signal are then time-frequency transformed as shown by 705 to generate time-frequency speech mono audio signals and time-frequency remainder binaural audio signals.

As shown by 707 then spatially process the time-frequency audio signals, the time-frequency speech mono audio signal and time-frequency remainder binaural audio signal, to generate a time-frequency binaural processed audio signal.

Then inverse time-frequency transform the time-frequency domain binaural processed audio signal to generate a binaural processed audio signal as shown by 709.

Then output the binaural processed audio signals to headphones as shown by 711.

Figure 8:
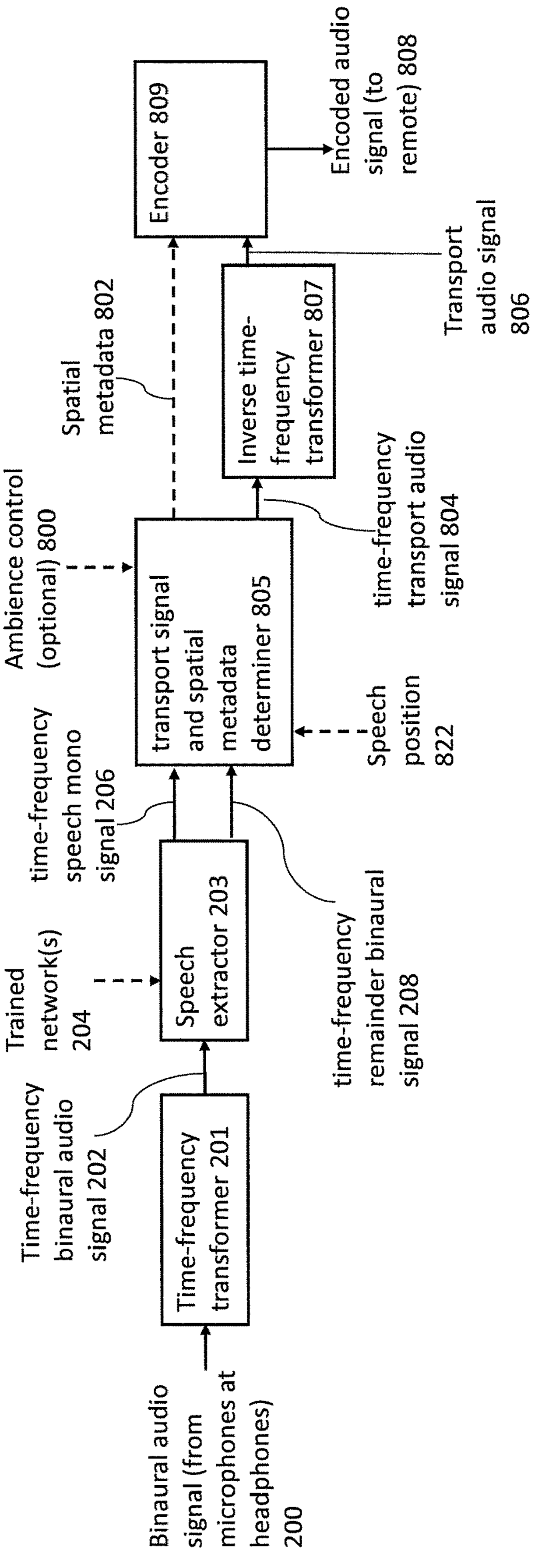
FIG. 8 shows schematically a further example capture apparatus suitable for implementing some embodiments.

With respect to FIG. 8 is shown a processor operating as a capture/encoder apparatus or device in an operating mode where the encoded audio signal which is generated is a MASA stream (or any other suitable parametric spatial audio stream) where a speech audio signal is provided together with a remainder binaural signal.

The processor is configured to receive as an input the binaural audio signal 200, obtained from the microphones at the headphones 119 as shown in FIG. 1.

The processor 103 furthermore in some embodiments comprises a time-frequency transformer 201, configured to receive the binaural audio signal 200 and transform them to generate a time-frequency binaural audio signal 202. The time-frequency transformer is the same as that described with respect to the example shown in FIG. 2.

The processor furthermore in some embodiments further comprise a speech extractor 203. The speech extractor 203 is configured to receive the time-frequency binaural audio signal 202 and furthermore the trained network(s) 204 and from these generate a time-frequency speech mono audio signal 206 and a time-frequency remainder binaural audio signal 208 in the same manner as discussed with respect to FIG. 2.

In some embodiments the processor comprises a transport signal and spatial metadata determiner 805 configured to receive the time-frequency speech mono audio signal $S_{speec}$ (b, n) 206 and the time-frequency remainder binaural audio signal $s_{remainder}$(b, n) 208 from the speech extractor 203. In some embodiments the determiner 805 is also configured to receive speech position/direction DOA(n) information 822. The speech position/direction information 822 may be obtained from the user, or it may be obtained, e.g., automatically from the capture device.

The determiner may first apply gains to control the levels of the speech and remainder signals by $$S'_{speech}(b,n)=g_s S_{speech}(b,n)$$

$$s'_{remainder}(b,n)=g_r s_{remainder}(b,n)$$

where the gains may be set for example in terms of how far the sound is to be rendered. For example, when the distance is increased, $g_s$ may become smaller. In some configurations, the level of the remainder is simply reduced with respect to the speech sound to improve clarity.

In some embodiments, the determiner 805 is further configured to obtain also an optional input of ambience control 800. The ambience control 800 can comprise information for controlling the levels of the speech and the remainder parts, e.g., the gains $g_s$ and $g_r$. This information may be obtained from the user, or it may be obtained, e.g., automatically from the capture device. In other embodiments, default values stored in the determiner 805 may be used.

The time-frequency transport audio signals 804 can be generated by $$s_{transport}(b,n)=p(\mathrm{DOA}(n))S'_{speech}(b,n)+s'_{remainder}(b,n)$$

where p(DOA(n)) is a column vector having panning gains according to DOA(n). For example, the panning function could be $$p(DOA(n)) = \begin{bmatrix} \sin(0.5 * \arcsin(DOA_y(n)) + 0.25\pi) \\ \cos(0.5 * \arcsin(DOA_y(n)) + 0.25\pi) \end{bmatrix}$$

where $DOA_y(n)$ is the y-axis component of a unit vector pointing towards DOA(n). The time-frequency transport audio signals 804 can be provided to an inverse time-frequency transformer 807.

The determiner 805 is further configured to generate spatial metadata 802 as an output. The spatial metadata 802 in some embodiments is MASA spatial metadata, so that the direction values of all frequency bands k are set to DOA(n), i.e., $$\mathrm{DOA}(k,n)=\mathrm{DOA}(n).$$

Furthermore, the direct-to-total energy ratios are determined by $$\mathrm{ratio}(k, n) = \frac{\sum_{b=b_{low}(k)}^{b_{high}(k)} \left|S'_{speech}(b, n)\right|^2}{\sum_{b=b_{low}(k)}^{b_{high}(k)} s^H_{transport}(b, n) s_{transport}(b, n)}$$

where $b_{low}(k)$ and $b_{high}(k)$ are the bottom and top frequency bins of frequency band k. The ratio value may be upper limited to 1, as it is possible in above formulas that the ratio slightly exceeds 1 depending on the signal phase relations.

In some embodiments other parameters of the MASA metadata may be set to zero (e.g., the coherences), or to any suitable values (e.g., the diffuseness may be determined as 1−ratio(k, n)).

The spatial metadata 802 is provided to the encoder 809 block.

In some embodiments the processor comprises an inverse time-frequency transformer 807 configured to receive the time-frequency transport audio signal 804 and apply an inverse transform corresponding to the one applied at the time-frequency transformer 201 to generate a transport audio signal 806.

In some embodiments the processor further comprises an encoder 809. The encoder 809 is configured to receive and encode the transport audio signal 806 and spatial metadata 802 to generate an encoded audio signal 808 and this can be output. The encoder thus applies suitable encoding, for example in case the transport audio signal 806 and the spatial metadata 802 are in the form of a MASA stream, an IVAS encoder may be used to encode them. Any suitable encoder can be employed as the encoder.

The encoded audio signal 808 can then be output from the encoder 809 and is provided to a remote decoder using the transceiver 111.

Figure 9:
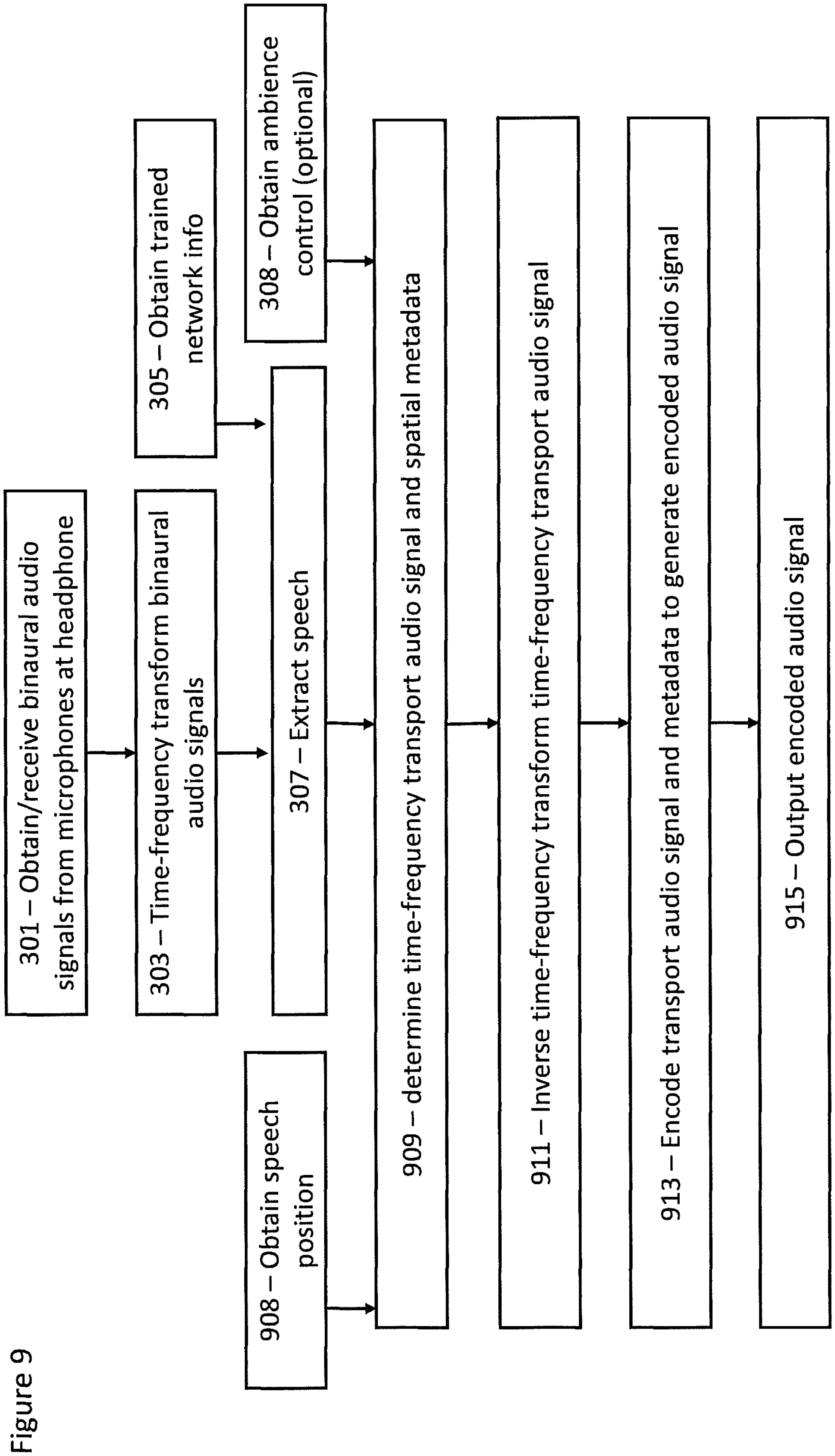
FIG. 9 shows a flow diagram of the operation of the further example capture apparatus shown in FIG. 8 according to some embodiments.

With respect to the FIG. 9 an example flow diagram showing the operations of the processor shown in FIG. 8 is shown according to some embodiments.

The processor can receive the binaural audio signal from the microphones as shown by 301.

The binaural audio signal can be transformed into a time-frequency binaural audio signal as shown by 303.

The method may then comprise obtaining the trained network information (for extracting the speech components) as shown by 305.

The speech components can then be extracted and a time-frequency speech mono audio signal and a time-frequency remainder binaural audio signal generated as shown by 307.

Additionally optionally then also obtaining the ambience control as shown by 308.

Furthermore there is obtaining the speech position as shown by 908.

Then determine the time-frequency transport audio signal and spatial metadata as shown by 909.

The time-frequency transport audio signal can then be inverse time-frequency transformed as shown by 911.

The time domain transport audio signal and metadata can then be encoded as shown in 913.

Finally the encoded audio signals are output as shown by 915.

Figure 10:
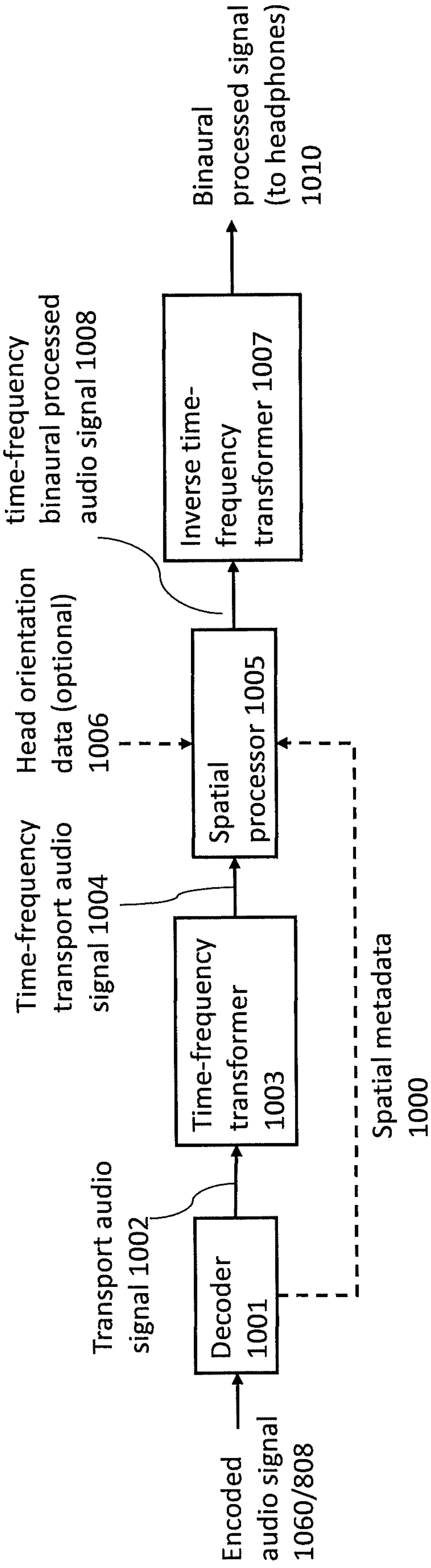
FIG. 10 shows schematically a further example playback apparatus suitable for implementing some embodiments.

With respect to FIG. 10 is shown a schematic view of the processor shown in FIG. 1 operating as a receiver/play-back apparatus or device and configured to receive the encoded signals provided by FIG. 8.

In some embodiments the receiver comprises a decoder configured to receive or obtain the encoded audio signal 1060 and is further configured to decode the encoded audio signal 1060 (the encoded audio signal is received from an encoder and which also is referred as reference 808 in FIG. 8). The decoder 1001 is configured to operate differently to the decoder described in FIG. 6. Instead of generating separate speech and the binaural signals, there is generated a decoded transport audio signal 1002, which comprises both the speech and the other binaural sounds.

Furthermore, the spatial metadata 1000 is decoded having spatial information in frequency bands as a part of the bit stream and provided to the spatial processor 1005. E.g., in case a MASA stream was encoded on the capture side using an IVAS encoder, the decoder 1001 can be implemented as an IVAS decoder.

The receiver can furthermore in some embodiments comprise a time-frequency transformer 1003 which are configured to receive the transport audio signal 1002 and generate a time-frequency transport audio signal 1004.

Furthermore the receiver can comprise a spatial processor 1005. The spatial processor 1005 is configured to receive the time-frequency transport audio signal 1004 and spatial metadata 1000 (and optionally the head orientation data 1006). In some embodiments the time-frequency transport audio signal 1004 and the spatial metadata 1000 are synchronized where the TF-transformer 1003 produces a delay to the audio path relative to the metadata path. In some embodiments this can be implemented by employing a delay to the spatial metadata with the same delay caused by the time-frequency transformer 1003 audio when the time-frequency transport audio signal 1104 arrives at the spatial processor 1006.

In a similar manner the spatial metadata 802 can be delayed before input to the encoder 809 shown in FIG. 8 in order to synchronize the spatial metadata with the transport audio signal 806 where the inverse time-frequency transformer 807 causes a delay to the transport audio signal 806 relative to the spatial metadata 802.

The spatial processor 1005 may be implemented based on any suitable manner. The spatial processor 1005 as such can implement the methods detailed in Vilkamo, J., Bäckström, T., & Kuntz, A. (2013). Optimized covariance domain framework for time-frequency processing of spatial audio. Journal of the Audio Engineering Society, 61(6), 403-411, Vilkamo, J., & Pulkki, V. (2013). Minimization of decorrelator artifacts in directional audio coding by covariance domain rendering. Journal of the Audio Engineering Society, 61(9), 637-646, and PCT application WO2019086757, where the operation steps are: Determining the input covariance matrix of the time-frequency transport audio signals in frequency bands; Determining the overall energy value in frequency bands which is the trace of the input covariance matrix; Determining a target covariance matrix in frequency bands based on the spatial metadata and the overall energy value; Determining a mixing matrix based on the input and target covariance matrices in frequency bands; Applying the mixing matrix to the time-frequency transport audio signals. The reference NC104083 provided novel spatial audio parameters spread coherence and surround coherence, which could be both assumed zero in these embodiment implementations.

Thus in summary in some embodiments the processor is configured to determine the spatial properties for the output sound in terms of a covariance matrix (e.g., a binaural sound has certain energies, cross correlations, and phase differences in different frequencies), and then determine a least-squares optimized solution to achieve for the sound such properties. If there are too few independent prominent signal components at the transport audio signals, it is an option to mix in decorrelated sound to an appropriate degree with a similar covariance-matrix based mixing operation.

In some embodiments the spatial processor is configured to use the head orientation data to rotate the direction values of the spatial metadata based on the head orientation data. For example, if the spatial metadata indicates a direction at front, but user rotates head by 30 degrees to the right, then the spatial metadata direction would be updated to 30 degrees left. Furthermore, in some embodiments the transport audio signals can be processed based on the head orientation data. For example, if the user is facing in a rear direction, the left and right transport audio signals could be processed to mutually replace each other (switched with each other).

The binaural processed time-frequency audio signal 1008 can then be provided to an inverse time-frequency transformer 1007.

In some embodiments the receiver comprises an inverse time-frequency transformer 1007 configured to output the binaural processed signal 1010 that is provided to the headphones to be played back to the user.

It should be noted that in some embodiments the decoder comprises all the features described herein. For example the IVAS decoder can decode and render an encoded IVAS stream (which may originate from a MASA stream) to binaural output.

Figure 11:
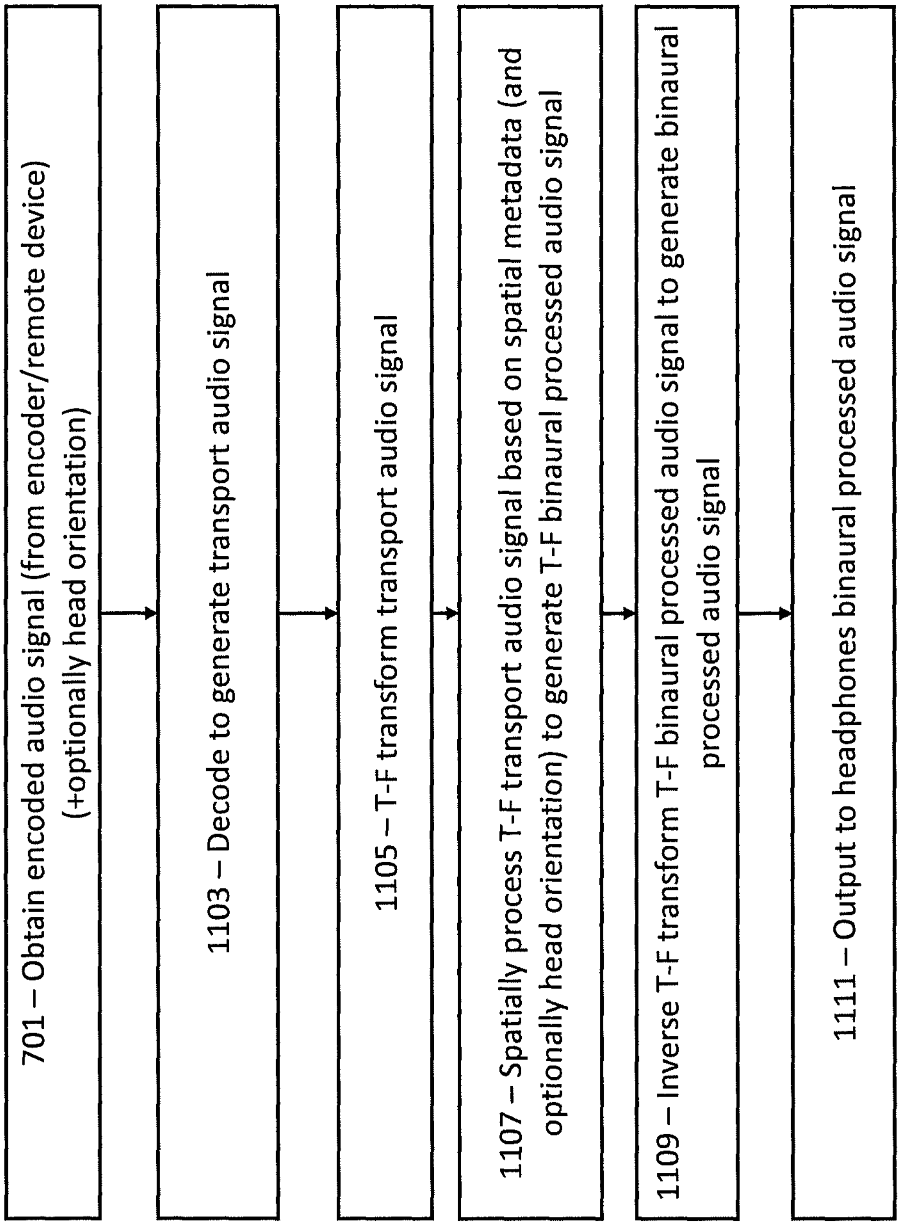
FIG. 11 shows a flow diagram of the operation of the further example playback apparatus shown in FIG. 10 according to some embodiments.

Furthermore with respect to FIG. 11 is shown a flow diagram of the operations of the example apparatus shown in FIG. 10 according to some embodiments.

Thus as shown by 701 there is obtaining encoded audio signal (from encoder) and optionally head orientation.

Then as shown by 1103 there is decoding the obtained encoded audio signal to generate transport audio signals.

The transport audio signals are then time-frequency transformed as shown by 1105.

As shown by 1107 then spatially process time-frequency transport audio signals based on spatial metadata (and optionally head orientation).

Then inverse time-frequency transform the time-frequency binaural processed audio signal to generate binaural processed audio signals as shown by 1009.

Then output the binaural processed audio signals to headphones as shown by 1011.

In some embodiments, the capture apparatus produces enhanced binaural signal or MASA-stream as an output. The user of the device may have an intention to share conversation from the space where they are currently located with other persons or devices. To produce a balanced conversation to the remote party, the user's own voice (with a small distance to the microphones) should be attenuated relatively to the voice of the other persons (further from the microphones). In some embodiments this can be achieved by using the gains $g_s$ and $g_r$ that can be used to controlling the levels of the speech and the remainder parts. The gains may be set so that the loudness of the speech of the user matched with the loudness of the speech of the other people. Or, the user may switch on an "ambient" mode, in which the user's own speech gets attenuated relatively to ambience sounds, and in other situation the user may switch on "own speech" mode, in which ambience gets attenuated and the user's own speech is focussed.

This can be implemented in some embodiments and applied in the decoding device. In some embodiments, the binaural signals may be rendered in the capture side (without the encoding/decoding operations), and the binaural signals may be transmitted (after encoding). In some embodiments, this kind of processing can be applied in an embodiment implementing the capture/playback apparatus shown in FIGS. 4 and 5 respectively.

Figures 12, 12A:
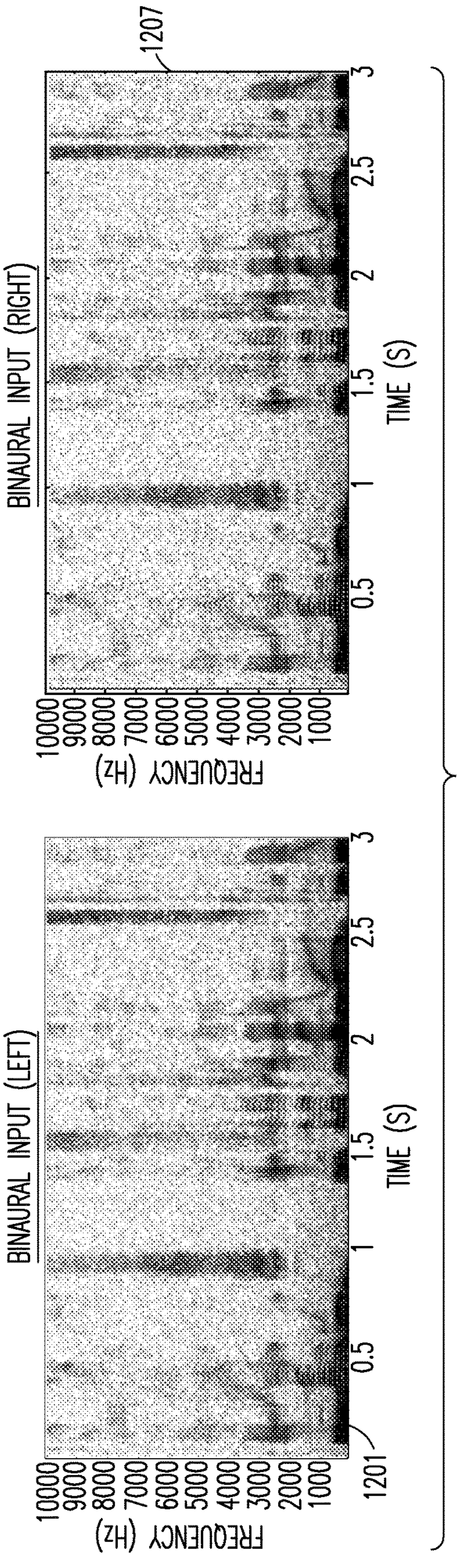
FIG. 12 shows example processing outputs.
Figure 12B:
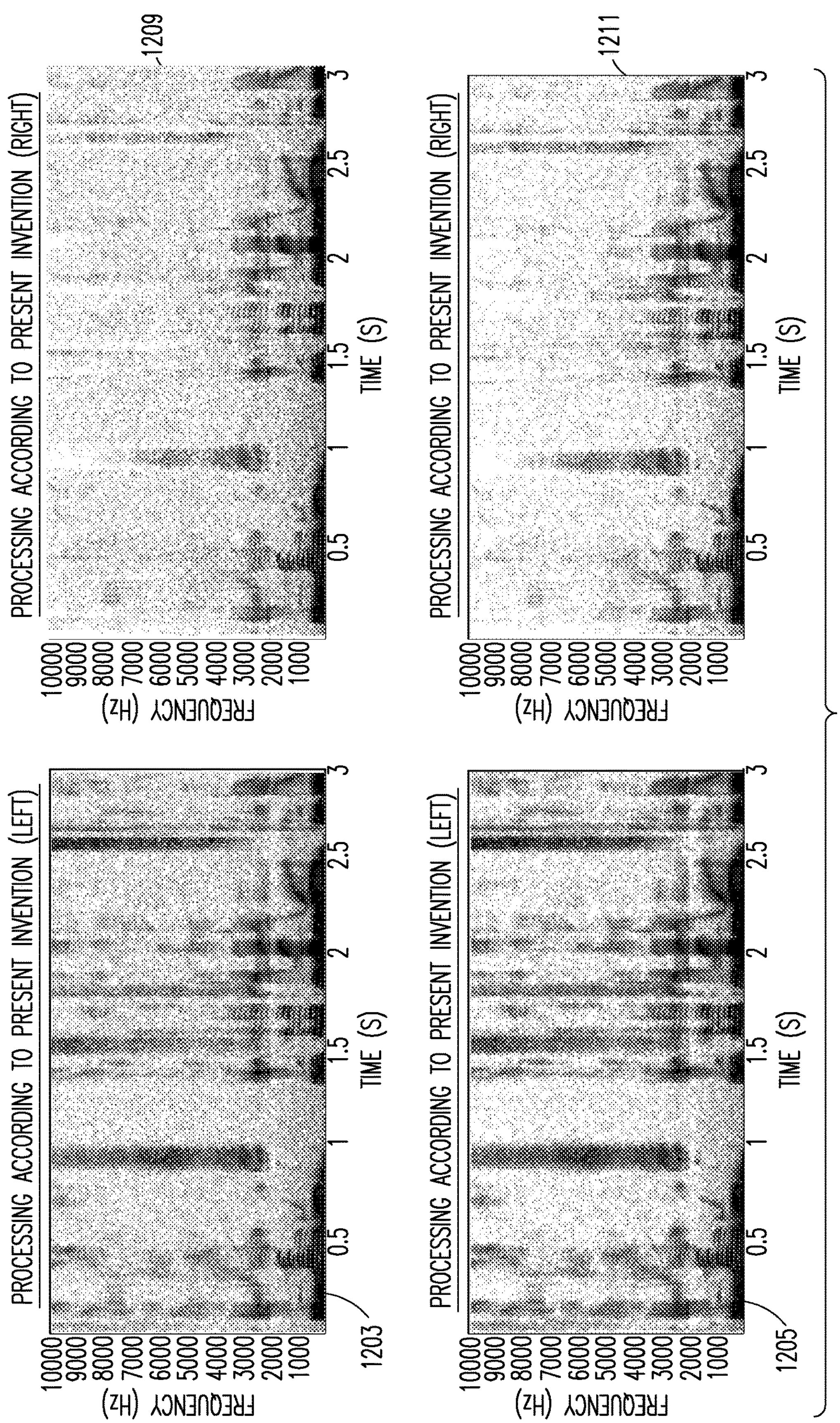

With respect to FIG. 12 is shown an example processing effect. In the upper row 1201 and 1207, the input to the system is shown, which is the left and right ear binaural audio signals. These could, e.g., be a real recording, but in this figure, they are simulated binaural signals. Note that the slight attenuation around 2 kHz is due to the method of simulation. In the captured signals, there are two sources, the speech of the user wearing the binaural microphones, and ambient noise incoherently from 36 even horizontal directions. In the first row furthermore it can be seen that the speech is equally loud in both channels (the left 1201 and the right 1207 columns). Thus, it is perceived to be inside the head, which is not desired. Note that in this uppermost example row the head tracking and speech binaural repositioning is not available.

In the middle row 1203 and 1209, the output of the processing according to some embodiments using the example apparatus shown in FIGS. 2 and 6 are shown. The speech is extracted and repositioned to 90 degrees, for example, if the listener is rotating head by this amount to the other direction. The ambience is not attenuated in this example. It can be seen in the figure that the speech is clearly louder in the left channel 1203 than in the right channel 1209, as it has been extracted and rendered to left using HRTFs.

In the lower row 1205 and 1211, another output of the processing according to some embodiments is shown. Also in this example the speech is positioned to 90 degrees, but in this example the ambience is attenuated by 6 dB. It can be seen in the figure that the level of ambience is lower in this example.

In some embodiments, the receiver apparatus is not an end user device, but a voice conference server. The voice conference server receives audio signals from multiple persons (or devices) that participate in same voice conference session, and the receiver is responsible for mixing these audio signals to output signals that are sent back to the participants. Each participant may receive a unique mix of the audio signals. In traditional spatial audio conferencing, incoming monophonic speech signals are treated as audio objects (each object may have distinct position around a specific listener), which are spatially processed and mixed to a spatial audio output signal which is sent to a participant. A mixing controller in the spatial mixer determines the directions of each audio object. These directions may be determined automatically from the number of audio objects, or the participants itself may interactively define directions for each audio object via a suitable control channel between receiver apparatus and the conference server.

In case some of the participants use binaural headsets for communication, the methods presented herein may be employed in the spatial mixing in the conference server.

When input audio signal (speech object and binaural remainder) according to the above embodiments is received at the conference server, prior to spatially mixing this input audio with other incoming audio signals, the mixing controller may determine gains for the speech and the remainder signals and direction for speech signal. For example, the controller may attenuate the remainder signal relatively to the speech signal to highlight the speech. Alternatively, if the binaural headset user has sent a request to the conference server to share ambient audio signal for the other participants, the mixer controller may amplify the remainder signal relatively to the speech signal itself. As earlier said, since the spatial mixing operation is typically a unique operation for each participant, it is possible that the receiving participant itself may control the gains of the speech and the remainder signals. At the same time, participant B may want to emphasize the speech clarity of participant A (who is using playback apparatus such as shown in the embodiments described herein), whereas user C may want to experience the ambience from participant A.

Optional speech position metadata may be available with the input audio signal. The conference mixing controller may or may not use this when determining the audio object properties.

In case of operation according to the embodiments described above, in some embodiments, the spatial mixer may send the speech and the remainder signals (together with the speech directions) from all participants (after potentially performing the aforementioned (individual) adjustments) to the users. This allows obtaining head-tracked rendering of all sources. In some other embodiments, the remainder signals may be mixed together before the transmission, as they do not need head-tracking (as they contain mostly ambient sounds), in order to reduce the number of channels being transmitted.

Moreover, in some embodiments, the spatial mixer may render the binaural signals (as presented in the above examples) already in the mixer (at least for some users). In this case, only two audio signals have to be transmitted. This may useful, e.g., in case the device of some user does not support head tracked rendering, and/or if the network conditions allow transmitting only a few audio signals. Similarly, the rendering can be performed to any format, such as 5.1 multichannel signals.

In some alternative embodiments, the spatial mixer may receive the binaural audio signals, and it may then perform processing according to the earlier embodiments. In case the spatial mixer is operating as presented in embodiment and creating a MASA stream, it may create an individual MASA stream from the binaural signal from each user, and it may then mix the MASA streams to a single MASA stream (e.g., using the methods presented in UK published application GB2574238). This way only two audio signals have to be transmitted to a user, while the server can still perform all the desired controls (e.g., the control of direction of the talkers and the controlling of the balance between speech and ambience).

In some further embodiments, a combination of the embodiments described herein can be employed. The capture device may operate as presented in where the speech audio object and the remainder binaural signals are transmitted to the spatial mixer (i.e., the "Encoded audio signal"). The spatial mixer may then create a parametric spatial audio stream (e.g., the MASA stream) using the transport signal and spatial metadata determiner. This may be performed for the signals from each user separately, and the resulting MASA streams may be combined as presented above. Then, only a single (individual) MASA stream has to be sent (after encoding) to each user.

In some embodiments, when the MASA stream is created in the capture device, the spatial mixer itself cannot easily control the spatial properties. In this case, the conference server may instruct the capture apparatus to process the binaural signals according to desired settings. In some embodiments, it is also possible to transmit, e.g., the object direction from the capture device to the spatial mixer, in which case some spatial modifications can still be performed in the spatial mixer (e.g., controlling the direction in the spatial metadata).

In some embodiments, the spatial mixer may also receive and/or create MASA streams from other inputs than binaural signals. Also these MASA streams can be mixed together with the MASA streams from the binaural signals (using, e.g., the same method NC105740 as discussed above).

Thus in some embodiments there can be the following options for transmitting the spatial audio from the user to the spatial mixer

- Determine the "Encoded audio signal" (containing the audio object and the binaural signals) in the capture device and transmit it to the spatial mixer.
- Determine the "Encoded audio signal" (containing the transport audio signals and the spatial metadata) in the capture device and transmit it to the spatial mixer.
- Transmit the captured "Binaural audio signal" to the spatial mixer, which then determines the audio object and the binaural signals.
- Transmit the captured "Binaural audio signal" to the spatial mixer, which then determines the transport audio signals and the spatial metadata.
- Determine the "Encoded audio signal" (containing the audio object and the binaural signals) in the capture device and transmit it to the spatial mixer. The spatial mixer then determines the transport audio signals and the spatial metadata.

The spatial mixer may then mix and process the content from various sources to obtain the desired mix in the desired format.

Furthermore in some embodiments the spatial mixer may be configured to transmit the (individual) mix(es) to the users in any suitable form(s). This may, e.g., be one of the following

- Spatial audio stream containing one or more audio objects and one or more binaural signals (the binaural signals from various sources may have been mixed together).
- Parametric spatial audio stream containing transport audio signals and spatial metadata.
- Rendered audio signals, such as binaural audio signals or 5.1 multichannel signals.

With respect to the training to provide the trained network information employed herein we note that when using term "channel" it refers to audio channels of a multi-channel signal. However, in machine learning literature, a "channel" is an often-used term that refers to a particular axis of the data flowing through the network, for example, a convolution layer having 32 filters produces 32 "channels". To distinguish the meanings, "channel" is used for audio, and "feature" is used when discussing the particular dimension of the data in the machine learning model.

As described earlier the apparatus 101 has a trained network in its memory, which refers to a machine learning model (or network) that has been trained based on a large set of input data examples to predict a corresponding set of output data examples. In the following, the example input data, output data, network architecture and training procedure is explained. As is typical in the field of machine learning, there is no single type of network structure that has to be used to achieve a certain goal, but there are many ways to alter the network structure (e.g., different network type, different number of filters, different number of layers, etc.).

In the following example, a structure is defined which shares some principles outlined in Choi, Hyeong-Seok, et al. "Real-Time Denoising and Dereverberation with Tiny Recurrent U-Net." ICASSP 2021-2021 IEEE International Conference on Acoustics, Speech and Signal Processing (ICASSP). IEEE, 2021. This example structure aims for computational simplicity. More complex structures may be implemented to enable a higher accuracy in the prediction task.

Figure 13:
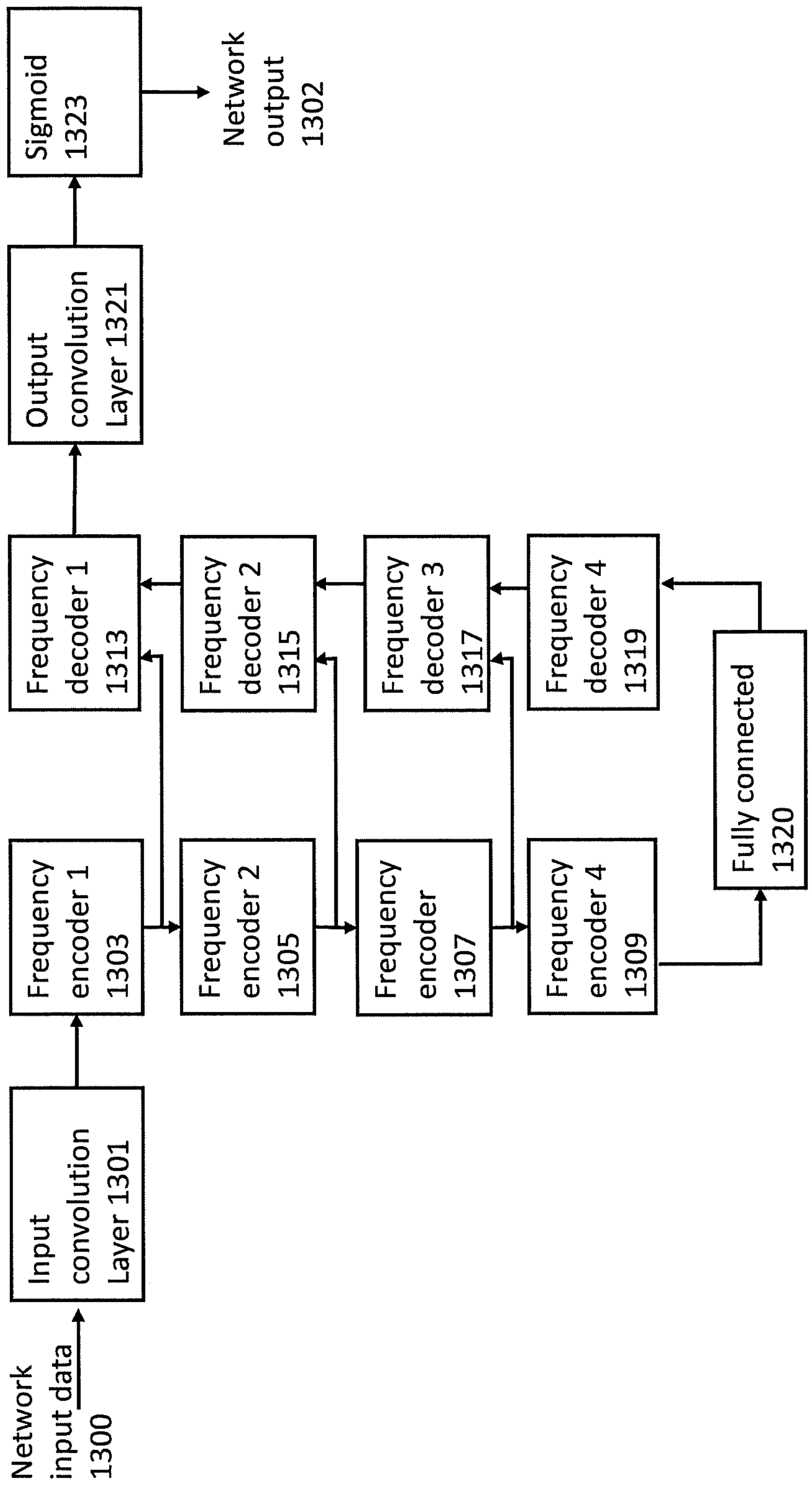
FIG. 13 shows an example network structure.

FIG. 13 shows an example network structure that is used in the following example embodiment. It is configured to receive network input data 1300 as an input, which is of form (num_T×num_F×num_C), where num_T is the number of temporal indices and num_F is the number of frequency bands and num_C is the number of input features. For frequency axis, we can set num_F=96, and for input features num_C=1, since there is only one input feature which is the spectrogram. For time axis, it is possible to use num_T=64. Note that this time axis is the size of the network training input sample, not the time dimension of the network.

The network input data 1300 in training is thus of shape (64×96×1). The network input data is denoted as I(n, k) where n is the temporal index, k is the frequency band index of the network input and the unity dimension of the features is omitted in this notation.

The first feature of the network input (in training) may be obtained by first obtaining the energy value $E_{dB}$(n, k) in decibels in frequency bands as described previously $$E_{dB}(n, k) = 10\log_{10}\sum_{b=b_{low}(k)}^{b_{high}(k)}\sum_{i=1}^{N_{ch}}|S(b, n, i)|^2$$

where $b_{low}$(k) and $b_{high}$(k) are the indices for the lowest and highest frequency bins of frequency band k. S(b, n, i) here refers to the training input audio data processed with STFT.

Then, a limiter value $E_{dB\_max}$(k) is formulated that is the largest of $E_{dB}$(n, k) over the whole data range n=1, . . . , 64, for each k independently, and the data is lower-limited by $$E'_{dB}(n,k)=\max\,(E_{dB}(n,k),E_{dB\_max}(k)-60)$$

Then, the data is normalized and set to as the network input data $$I(n, k) = \frac{E'_{dB}(n, k) - E'_{dB\_mean}(k)}{E'_{dB\_std}(k)}$$

where the $E'_{dB\_mean}$(k) is the mean and $E'_{dB\_std}$(k) is the standard deviation of $E'_{dB}$(n, k) over the complete data range n=1, . . . ,64, for each band independently.

The network structure of FIG. 13 is described next. The first layer in the network to process the network input 1300 I(n, k) is the input convolution layer 1301 which can consist of 20 filters of size 1×20 without zero padding. In machine learning terminology, this means that padding is set "valid". This means that the convolution maps the 20 temporal indices of the data to 20 feature indices. In other words, the output of this layer in training is (45×96×20). The result data is provided to the Frequency encoder 1 1303. The temporal axis was reduced from 64 to 45 due to this operation, so at the training the network receives 64 temporal indices data, but provides estimates only for 45 outputs. This corresponds to the inference stage situation where the network is provided with 20 temporal indices data, and provides only one temporal index of data, the current temporal frame gains.

Each of the frequency encoders 1303, 1305, 1307, 1309 consist of a sequence of the following layers: 1) Batch normalization, 2) rectified linear unit (ReLU) and 3) convolution. The filters are of shape (1×3) and have stride (1,2), and they thus operate only on the frequency dimension (i.e., not temporal). In other words, having a filter of size (1×3) means convolution only on frequency dimension and having a stride of (1,2) means downsampling by factor of 2 only on the frequency dimension, while the temporal dimension is not downsampled. The frequency encoders operate on the following number of output features: Frequency encoder 1 1303: 32; Frequency encoder 2 1305: 64; Frequency encoder 3 1307: 64; Frequency encoder 4 1309: 128. Each frequency encoder (except for the last one) provides its output to the next encoder, but also to a corresponding-level frequency decoder 1313, 1315, 1317, 1319. The last frequency encoder 4 1309 block provides its output to the fully connected 1320 block. At this stage, the data is at form (45×6×128), so the frequency dimension has been gradually reduced to 6.

The Fully connected block 1320 reshapes the last two dimensions of (45×6×128) to shape (45×768), and applies 1) batch normalisation, 2) ReLu, and 3) dense (i.e., fully connected) operation to the data. The resulting data is reshaped from (45×768) back to shape (45×6×128),and provided to the frequency decoder 4 1319.

Similar to the frequency encoders 1303, 1305, 1307, 1309, the frequency decoders 1313, 1315, 1317, 1319 operate only on the frequency axis. Except for the frequency decoder 4 1319, which obtains the input only from the Fully connected 1320 block, the other frequency decoders 1317, 1315, 1313 obtain two inputs, first being the output of the corresponding index frequency encoder and second being the output of the previous frequency decoder. These frequency decoders concatenate the two input data sets on the feature axis for processing. For example, when frequency decoder 3 1317 receives data from frequency encoder 3 1307 in from (45×12×64) and from frequency decoder 4 1319 data in form (45×12×128), the concatenated data is of form (45×12×192). These Frequency decoders include the following layers: 1) Batch normalization, 2) Rectified linear unit (ReLU) and 3) transposed convolution. The filters are of shape (1×3) and have stride (1,2). The frequency decoder operates on the following number of output features: Frequency decoder 1 1313: 32; Frequency decoder 2 1315: 64; Frequency decoder 3 1317: 64: Frequency decoder 4 1319: 128. The output of the frequency decoder 1 1313 is then of shape (45×96×32).

Frequency decoder 1 1313 finally provides its output to the output convolution layer 1321, which applies a 1×1 convolution with one filter to convert the shape (45×96×32) data to the final form of (45×96×1). The result is processed by the Sigmoid block 1323, applying the sigmoid function to the data, and the result is the output of the neural network. The sigmoid function may have been modified to range from a small negative value to a value exceeding 1 by a small amount, to avoid numerical instabilities in the training.

In other words, in the training stage, the network predicts from (64×96×1) size data an output data of size (45×96×1). The input was the spectral information and the output consists of gains for each time and frequency at the data, without the first 19 temporal indices of the spectrogram. In the inference, the input data time dimension is not 64 but 20, providing output shape (1×96×1), i.e., 96 values.

The training is performed by using two data sets of audio files: clean speech and various noises. In training, these data sets are randomly mixed (speech and noise items selected randomly, and temporally cropped randomly) with random gains for each (thus having random "speech-to-noise ratio"). The mixture is produced by summing these speech and noise signals produced this way. This approach enables having the clean speech reference available. The network spectral input is formulated based on the mixture, and the network predicts an output which is used as the gains in each frequency band to process the mixture audio signals. Due to training, the network then learns to predict meaningful such output or gain values.

More specifically, the aforementioned signals (mixture and speech) are PCM signals with a sampling rate of 48 kHz, which are converted to the time-frequency domain using a short-time Fourier transform (STFT) with a sine window, hop size of 1024 samples and FFT size of 2048 samples. This results is a time-frequency signal having 1025 unique frequency bins and 64 time steps. The frequency bin data is then converted to the neural network input data as described in the foregoing. Furthermore, when processing the 1025-bin mixture signal with the predicted gains (i.e., the network output) having 96 values, each kith gain is used to process the frequency bins at the range from $b_{low}(k)$ to $b_{high}(k)$ to obtain the output where non-speech signals are suppressed.

To guide the network training, it is needed to define a loss function that provides a value that defines how well the network is predicting the desired result. For the loss function, a difference signal is formulated between the ground truth speech signal (i.e., the clean speech reference) and the gain-processed mixture. The loss function formulates the energy of the difference signal with respect to the energy of the mixture in decibels. The Adam optimizer with a learning rate of 0.001 and batch size of 120 is applied at the training.

Due to training, the network weights converge, and they are then provided to the memory of the apparatus of FIG. 1 to be used.

It is also possible to train one machine learning model with a specific architecture, then derive another machine learning model from that using processes such as compilation, pruning, quantization or distillation. The term "Machine Learning Model" covers also all these use cases and the outputs of them. The machine learning model can be executed using any suitable apparatus, for example CPU, GPU, ASIC, FPGA, compute-in-memory, analog, or digital, or optical apparatus. It is also possible to execute the machine learning model in apparatus that combine features from any number of these, for instance digital-optical or analog-digital hybrids. In some examples the weights and required computations in these systems can be programmed to correspond to the machine learning model. In some examples the apparatus can be designed and manufactured so as to perform the task defined by the machine learning model so that the apparatus is configured to perform the task when it is manufactured without the apparatus being programmable as such.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device. The term "non-transitory," as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for generating a spatial audio stream, the method comprising:

obtaining at least two audio signals from at least two microphones, wherein the at least two microphones are configured to capture binaural audio, wherein the at least two microphones are mounted on earphones or headphones worn by a user;

extracting from the at least two audio signals a first audio signal, the first audio signal comprising at least partially speech of the user;

extracting from the at least two audio signals a second audio signal, wherein the speech of the user is substantially not present within the second audio signal; and encoding the first audio signal and the second audio signal to generate the spatial audio stream such that a rendering of the speech of the user to at least one of a controllable direction or distance is enabled.

2. The method as claimed in claim 1, wherein the spatial audio stream further enables a controllable rendering of captured ambience audio content.

3. The method as claimed in claim 1, wherein extracting from the at least two audio signals the first audio signal further comprises applying a machine learning model to the at least two audio signals or at least one audio signal based on the at least two audio signals to generate the first audio signal.

4. The method as claimed in claim 3, wherein applying the machine learning model to the at least two audio signals or at least one audio signal based on the at least two audio signals to generate the first audio signal further comprises:

generating a first speech mask based on the at least two audio signals; and separating the at least two audio signals into a mask processed speech audio signal and a mask processed remainder audio signal based on application of the first speech mask to the at least two audio signals or at least one audio signal based on the at least two audio signals.

5. The method as claimed in claim 4, wherein extracting from the at least two audio signals the first audio signal further comprises beamforming the at least two audio signals to generate a speech audio signal.

6. The method as claimed in claim 5, wherein beamforming the at least two audio signals to generate the speech audio signal comprises:

determining steering vectors for the beamforming based on the mask processed speech audio signal;

determining a remainder covariance matrix based on the mask processed remainder audio signal; and applying a beamformer configured based on the steering vectors and the remainder covariance matrix to generate a beam audio signal.

7. The method as claimed in claim 6, wherein applying the machine learning model to the at least two audio signals or at least one audio signal based on the at least two audio signals to generate the first audio signal further comprises:

generating a second speech mask based on the beam audio signal; and applying a gain processing to the beam audio signal based on the second speech mask to generate the speech audio signal.

8. The method as claimed in claim 7, wherein extracting from the at least two audio signals the second audio signal comprises:

generating a positioned speech audio signal from the speech audio signal; and subtracting from the at least two audio signals the positioned speech audio signal to generate the at least one remainder audio signal.

9. The method as claimed in claim 3, wherein applying the machine learning model to the at least two audio signals or at least one signal based on the at least two audio signals to generate the first audio signal further comprises equalizing the first audio signal.

10. The method as claimed in claim 1, wherein extracting from the at least two audio signals the first audio signal comprising the speech of the user comprises:

generating the first audio signal based on the at least two audio signals; and generating an audio object representation, the audio object representation comprising the first audio signal.

11. The method as claimed in claim 10, wherein extracting from the at least two audio signals the first audio signal further comprises:

analysing the at least two audio signals to determine at least one of a direction or position relative to the at least two microphones associated with the speech of the user, wherein the audio object representation further comprises at least one of the direction or position relative to the at least two microphones.

12. The method as claimed in claim 10, wherein generating the second audio signal further comprises generating binaural audio signals.

13. The method as claimed in claim 1, wherein encoding the first audio signal and the second audio signal to generate the spatial audio stream comprises:

mixing the first audio signal and the second audio signal to generate at least one transport audio signal;

determining at least one directional or positional spatial parameter associated with a desired direction or position of the speech of the user; and encoding the at least one transport audio signal and the at least one directional or positional spatial parameter to generate the spatial audio stream.

14. The method as claimed in claim 13, further comprising obtaining an energy ratio parameter, and wherein encoding the at least one transport audio signal and the at least one directional or positional spatial parameter comprises further encoding the energy ratio parameter.

15. The method as claimed in claim 1, wherein the first audio signal is a single channel audio signal.

16. The method as claimed in claim 1, wherein the at least two microphones are located in an audio scene comprising the user as a first audio source and a second audio source, and the method further comprises:

extracting from the at least two audio signals the first audio signal, the first audio signal comprising at least partially the second audio source; and extracting from the at least two audio signals at the second audio signal, wherein sound of the first audio source is further first substantially not present within the second audio signal, or the sound of the first audio source is within the second audio signal.

17. The method as claimed in claim 16, wherein the first audio source is a talker and the second audio source is a further talker.

18. An apparatus for generating a spatial audio stream, the apparatus comprising:

at least one processor; and at least one memory storing instructions that, when executed with the at least one processor, cause the apparatus at least to:

obtain at least two audio signals from at least two microphones, wherein the at least two microphones are configured to capture binaural audio, wherein the at least two microphones are mounted on earphones or headphones worn by a user;

extract from the at least two audio signals a first audio signal, the first audio signal comprising at least partially speech of the user;

extract from the at least two audio signals a second audio signal, wherein the speech of the user is substantially not present within the second audio signal; and encode the first audio signal and the second audio signal to generate the spatial audio stream such that a rendering of the speech of the user to at least one of a controllable direction or distance is enabled.

19. A non-transitory computer readable medium comprising instructions that, when executed by an apparatus, cause the apparatus to perform at least the following:

obtaining at least two audio signals from at least two microphones, wherein the at least two microphones are configured to capture binaural audio, wherein the at least two microphones are mounted on earphones or headphones worn by a user;

extracting from the at least two audio signals a first audio signal, the first audio signal comprising at least partially speech of the user;

extracting from the at least two audio signals a second audio signal, wherein the speech of the user is substantially not present within the second audio signal; and encoding the first audio signal and the second audio signal to generate a spatial audio stream such that a rendering of the speech of the user to at least one of a controllable direction or distance is enabled.

* * * * *